US012681929B1

(12) United States Patent
Vosough et al.

(10) Patent No.: US 12,681,929 B1
(45) Date of Patent: Jul. 14, 2026

(54) UTILIZING ARTIFICIAL INTELLIGENCE FOR DATA MANAGEMENT AND DATA VISUALIZATION

(71) Applicant: Palo Alto Networks, Inc., Santa Clara, CA (US)

(72) Inventors: Zana Vosough, San Francisco, CA (US); Gino John, Cupertino, CA (US); Manuel Bernardo Maguina Morello, Morgan Hill, CA (US); Sameer D. Merchant, Sunnyvale, CA (US); Rajesh Bhagwat, Los Gatos, CA (US); Roy Ronald Riojas Montenegro, Gilroy, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 19/018,867

(22) Filed: Jan. 13, 2025

(51) Int. Cl.
| | |
|---|---|
| *G06F 16/00* | (2019.01) |
| *G06F 16/2452* | (2019.01) |
| *G06F 16/26* | (2019.01) |
| *G06N 20/00* | (2019.01) |

(52) U.S. Cl.
CPC ........ *G06F 16/24522* (2019.01); *G06F 16/26* (2019.01); *G06N 20/00* (2019.01)

(58) Field of Classification Search
CPC ............................ G06F 16/24522; G06F 16/26
See application file for complete search history.

(56) References Cited

U.S. PATENT DOCUMENTS

| | | | |
|---|---|---|---|
| 12,079,737 B1 * | 9/2024 | Biswas | .................. G06F 16/26 |
| 12,242,490 B2 * | 3/2025 | Pandey | ............. G06F 16/24578 |
| 12,363,169 B2 | 7/2025 | Vahlis | |
| 12,555,168 B2 | 2/2026 | Brenner | |
| 2016/0335400 A1 * | 11/2016 | Grant | ..................... G16H 10/60 |
| 2020/0134032 A1 | 4/2020 | Lin | |
| 2022/0050884 A1 * | 2/2022 | Sahu | ........................ G06N 5/04 |
| 2024/0143452 A1 | 5/2024 | Brenner | |
| 2024/0143822 A1 | 5/2024 | Brenner | |
| 2024/0354872 A1 * | 10/2024 | Dunlop | ............. G06Q 10/0875 |
| 2024/0406166 A1 * | 12/2024 | Bell | ....................... G06N 3/045 |
| 2025/0005523 A1 * | 1/2025 | Katta | .................. G06F 16/2455 |
| 2025/0182219 A1 * | 6/2025 | Lebwohl | ............... G06Q 10/40 |
| 2025/0278401 A1 * | 9/2025 | Nimmagadda | ........ G06F 16/243 |
| 2025/0284963 A1 * | 9/2025 | Abhyankar | ............ G06N 20/00 |
| 2026/0023988 A1 | 1/2026 | Venkataramanan | |

FOREIGN PATENT DOCUMENTS

| | | |
|---|---|---|
| CN | 119513252 | 2/2025 |
| EP | 4220457 | 10/2024 |
| WO | 2024228863 | 11/2024 |

* cited by examiner

*Primary Examiner* — Noosha Arjomandi
(74) *Attorney, Agent, or Firm* — Van Pelt, Yi & James LLP

(57) ABSTRACT

A first dashboard is generated utilizing a machine learning model and user settings associated with a user. One or more follow-up prompts are received. Data needed to answer the one or more follow-up prompts is determined and obtained utilizing one or more data catalogs. One or more subsequent dashboards are generated utilizing the machine learning model and the user settings associated with the user.

15 Claims, 26 Drawing Sheets

200

300

Receive A Prompt — 302

Determine Which Catalogs From A Plurality Of Catalogs That Are Relevant To Answer The Prompt — 304

Determine A SQL Command To Answer The Prompt — 306

Execute The SQL Command To Retrieve The Data — 308

Apply Security Policies — 310

Normalize The Located Data — 312

Generate Query Response Based On Application Of The Security Policies — 314

Catalog - Asset

```
{
  "header": {
    "asset": "instance_health_check",
    "domain": "sase",
    "sub_domain": ["access"],
    "description": ["stores info about each instance status"],
    "type": "timeseries",
    "timeseries": {
      "date_column": "event_time"
    }
  },
  "rate": {
    "description": ["One record per instance per edge location per minute until they are deleted. Does not generate a record if status is Unknown"],
    "value": 1,
    "frequency": "minute",
    "key": ["instance_id", "edge_location_display_name"]
  },
  "tags": ["prisma access", "pa-instance-status"],
  "permission": ["permission1", "permission2"],
  "dataExpiry": {
    "enabled": false,
    "value": null,
    "frequency": null
  },
  "dataSource": {
    "type": "internal",
    "method": "pipeline"
  },
  "dataStore": {
    "storeType": "bigquery",
    "type": "resource",
    "bigquery_resource": {
      "project": "$[pa_dataset_project}",
      "dataset": "pa_insight_dataset",
      "name": "instance_health_check_v2",
      "type": "table",
      "requiredColumn": ["event_time"]
    }
  },
  "uniqueRecordIdentifier": ["instance_id", "edge_location_display_name"],
  "defaultTimeRange": {
    "value": 3,
    "unit": "hours"
  }
},
```

FIG. 4

Catalog - Column/Properties - 1/2

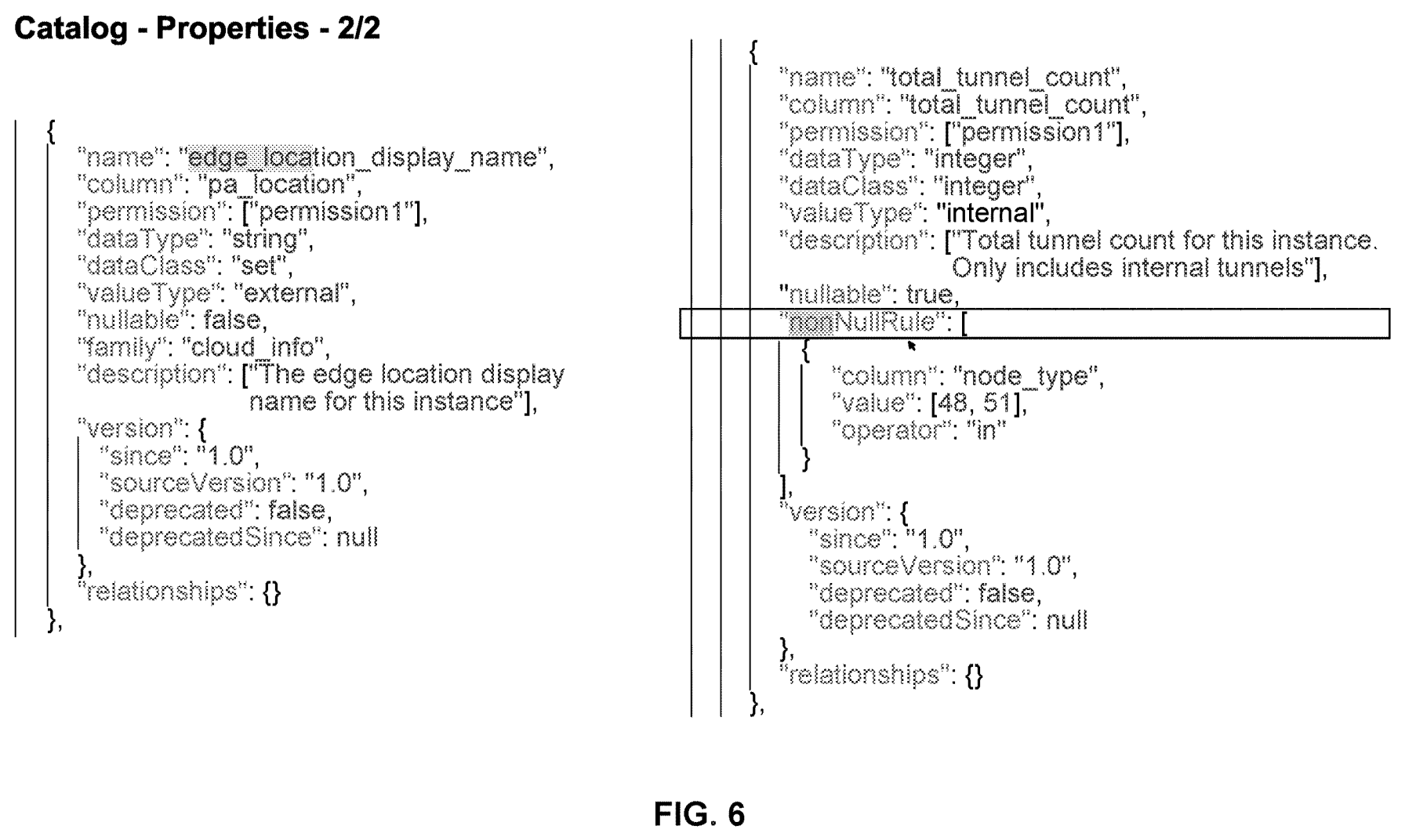

```
{
    "name": "total_tunnel_count",
    "column": "total_tunnel_count",
    "permission": ["permission1"],
    "dataType": "integer",
    "dataClass": "integer",
    "valueType": "internal",
    "description": ["Total tunnel count for this instance.
                     Only includes internal tunnels"],
    "nullable": true,
    "NullRule": [
        {
            "column": "node_type",
            "value": [48, 51],
            "operator": "in"
        }
    ],
    "version": {
        "since": "1.0",
        "sourceVersion": "1.0",
        "deprecated": false,
        "deprecatedSince": null
    },
    "relationships": {}
},
```

FIG. 6

Catalog - Properties - 2/2

```
{
    "name": "edge_location_display_name",
    "column": "pa_location",
    "permission": ["permission1"],
    "dataType": "string",
    "dataClass": "set",
    "valueType": "external",
    "nullable": false,
    "family": "cloud_info",
    "description": ["The edge location display
                     name for this instance"],
    "version": {
        "since": "1.0",
        "sourceVersion": "1.0",
        "deprecated": false,
        "deprecatedSince": null
    },
    "relationships": {}
},
```

```
{
  "copilot_name": "data_explore",
  "graph_type": "table_knowledge_graph",
  "graph_name": "catalog_kg",
  "subject": "${site_status} ",
  "predicate": "has_column",
  "object": "site_name"
}, {
  "copilot_name": "data_explore",
  "graph_type": "table_knowledge_graph",
  "graph_name": "catalog_kg",
  "subject": "${site_status)",
  "predicate": "has_column",
  "object": "site_state_name"
}
```

900
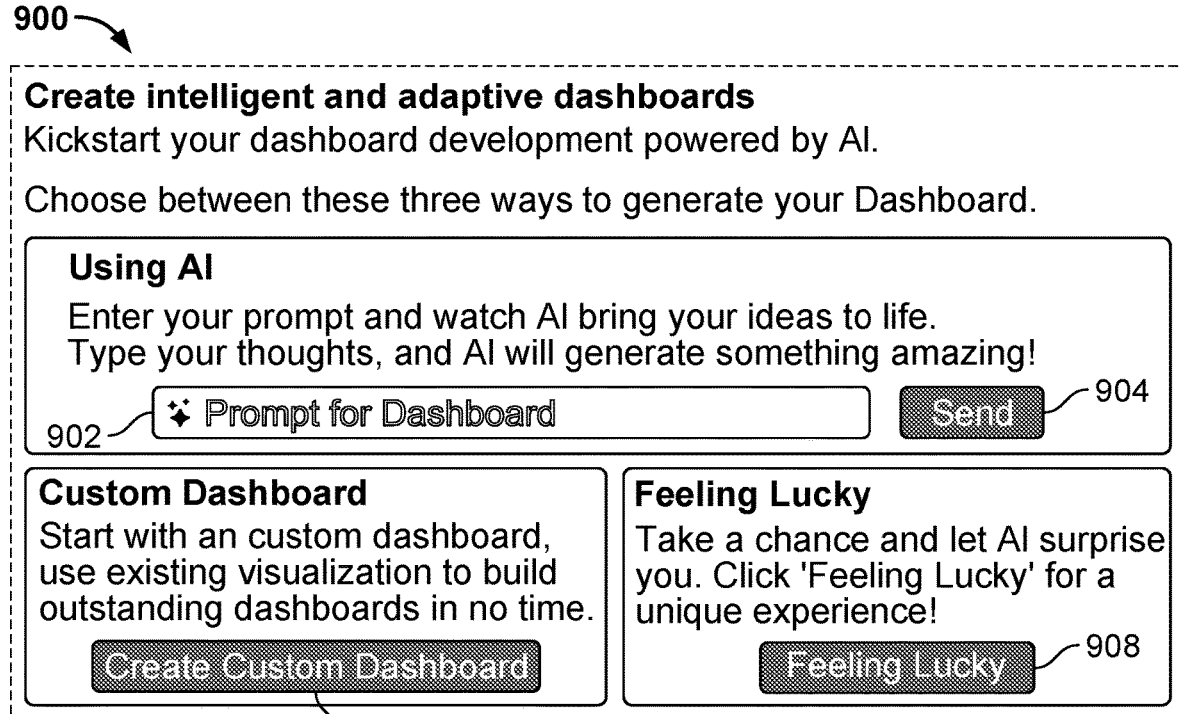
FIG. 9A
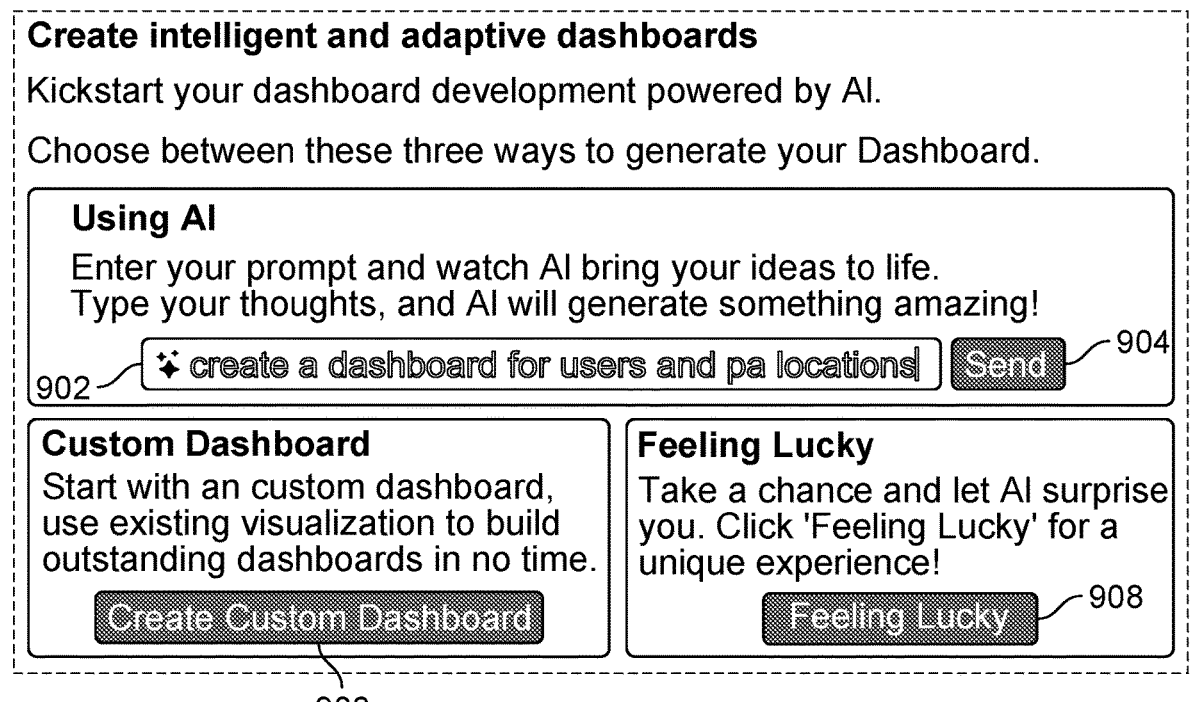
906     FIG. 9B

FIG. 12

Field List Example: Style

```
[
  {
    "name": "URLs by Risk Level",
    "display name": "URLs by Risk Level",
    "summary": "",
    "query explanation": "",
    "data vis preferences": [],
    "observation": [
      {
        "risk level": "low risk",
        "risk_urls_count": 18
      },
      {
        "risk level": "medium risk",
        "risk_urls_count": 10
      },
      {
        "risk level": "high risk",
        "risk_urls_count": 30
      }
    ],
    "fieldList": [
      {
        "alias": "risk urls count",
        "column": "risk_urls_count",
        "dataClass": "integer",
        "dataType": "integer",
        "description": "Risk Levels count",
        "displayName": "Risk Urls Count",
        "unit": null,
        "functions": [],
        "sequence": 2,
        "style": null,
        "valueFunction": "count_distinct"
      },
      {
        "alias": "risk level",
        "column": "risk level",
        "dataClass": "string",
        "dataType": "string",
        "description": "risk level details",
        "displayName": "Risk Level",
        "unit": null,
        "functions": [],
        "sequence": 1,
        "style": {
          "type": "enum",
          "trendDirection": "",
          "values": [
            {
              "key": "high risk",
              "color": "$B22020",
              "icon": ""
            },
            {
              "key": "medium risk",
              "color": "$F38C16",
              "icon": ""
            },
            {
              "key": "low risk",
              "color": "$FAD957",
              "icon": ""
            }
          ]
        },
        "valueFunction": ""
      }
    ]
  }
]
```

1600

1650

Summary: These are the top 5 device categories in your network by number of devices.ntotal_time: 0.02

View as [▥ Bar]   [⤳ Line]   [◎ Donut]   [▦ Table]

1652    1653    1654    1655

1670

Summary: These are the top 5 device categories in your network by number of devices.ntotal_time: 0.02

View as [◎ Donut]   [⤳ Line]   [▥ Bar]   [▦ Table]

1652    1653    1654    1655

1702

| US West | 2308 |
| Canada West | 1847 |
| Canada East | 1146 |
| Italy | 898 |
| Finland | 896 |
| US Southwest | 581 |

Total: 10

Query    Visualize

1760

Visualization                    ☑ Sync ⋮

Visualization | DVL | Name

View as  🌐 Map   ▮▮▮ Bar   ☷ Table

UTILIZING ARTIFICIAL INTELLIGENCE FOR DATA MANAGEMENT AND DATA VISUALIZATION

BACKGROUND OF THE INVENTION

In large organizations, data management is often decentralized, with multiple teams controlling various data lakes. While this fragmented structure helps maintain ownership and expertise, it creates significant challenges in achieving a unified view of the organization's data landscape. The lack of integration between these isolated data sources hampers the ability to derive comprehensive insights, limits collaboration, and increases the complexity of ensuring data security, privacy, and access control. One area where this fragmentation becomes particularly evident is in the creation of dashboards, which are visual tools designed to provide a quick overview of key information. Building dashboards from disparate data sources is an expensive and time-consuming process, as each new request requires significant resources for implementation. While data analysts/scientists can generate dashboards for specific use cases, the widgets they include (e.g., charts, graphs, tables, gauges, and maps) are often static. These dashboards provide valuable insights, but their limited flexibility restricts them to displaying only the data they were explicitly programmed to show, further highlighting the need for a more integrated and dynamic approach to data management.

BRIEF DESCRIPTION OF THE DRAWINGS

Various embodiments of the invention are disclosed in the following detailed description and the accompanying drawings.

FIG. 4 illustrates an example of a data catalog in accordance with some embodiments.

FIG. 6 illustrates an example of property information associated with a column in accordance with some embodiments.

FIGS. 9A and 9B illustrate an example of a user interface to generate a dashboard in accordance with some embodiments.

FIG. 12 illustrates an example of styling with data catalog in accordance with some embodiments.

DETAILED DESCRIPTION

Figure 1:
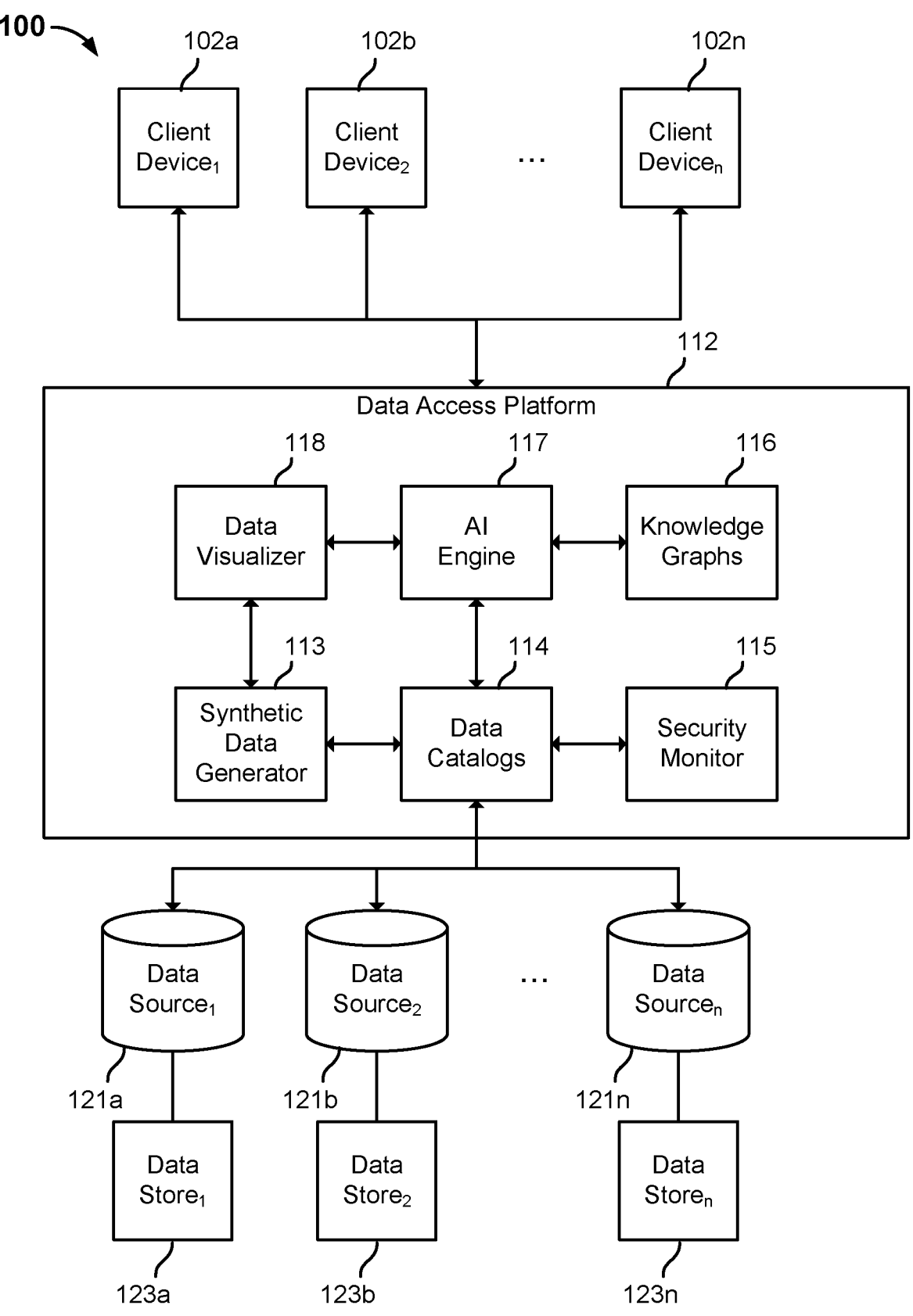
FIG. 1 is a block diagram illustrating a system to provide centralized access to data associated with disparate data sources stored in a plurality of data stores in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A data access platform that includes a plurality of data catalogs for data associated with a plurality of disparate data sources stored in a plurality of data stores is disclosed herein. Without a centralized system, leveraging advanced analytical tools becomes difficult, leaving valuable patterns and correlations undiscovered. The data access platform acts as a central data repository that unifies access to the data associated with the plurality of disparate data sources. The need for a solution that bridges these silos without disrupting the existing data ownership structure is critical to unlocking the full potential of the organization's data assets. Organizations may utilize the data access platform to catalog, integrate, and analyze data from multiple teams and data lakes without physically moving the data, thereby preserving the existing ownership structure. Leveraging generative artificial intelligence (AI) technology, the data access platform enables users to discover, query, and visualize data through an intuitive interface that supports natural language interactions and real-time interactivity.

FIG. 1 is a block diagram illustrating a system to provide centralized access to data associated with disparate data sources stored in a plurality of data stores in accordance with some embodiments. In the example shown, system 100 includes data access platform 112. Data access platform 112 is configured to provide a user interface (UI) to client devices 102a, 102b, . . . , 102n. The UI enables a user associated with a client device to discover, query, and visualize data associated with the plurality of disparate data sources 121a, 121b, . . . , 121n having their data stored in corresponding data stores 123a, 123b, . . . , 123n. The disparate data sources 121a, 121b, . . . 121n and corresponding data stores 123a, 123, . . . , 123n are associated with different systems that are managed by different entities (e.g., teams, groups, organizations, etc.).

Although three client devices are shown in FIG. 1, system 100 may include 1:n client devices. A client device may be a computer, a laptop, a desktop, a tablet, a smartphone, or any other computing device having the ability to communicate over the Internet. A client device may be associated with different types of users, such as enterprise users, managed service provider users, support users, product managers, etc.

Data access platform 112 is configured to provide access to data stored in a plurality of disparate data stores 123a, 123b, . . . 123n without having to physically move the data, thereby preserving the existing ownership associated with the data.

A data source may be a cloud delivered security source (CDSS), an on-prem security product (e.g., firewall), a security access service edge (SASE) cloud-delivered platform, a cloud next-generation firewall, a centralized management platform, a cloud management platform, etc.

A CDSS may include data associated with a domain name system (DNS) server, data associated with a cloud-based threat analysis and prevention service designed to detect and stop advanced cyber threats, data associated with threat prevention, data associated with advanced uniform resource locator (URL) protection, data associated with Internet of Things (IoT) devices, data associated with Software as a Service (SaaS) products, etc.

An on-prem data source may include data associated with a security service, data associated with one or more virtual machines, data associated with one or more containers, etc.

An SASE data source may include data associated with a security service, data associated with a remote user monitor, data associated with a software-define wide area network, etc.

A cloud next-generation firewall data source may include data associated with one or more virtual machines.

Each of the plurality of disparate data stores 123a, 123b may include one or more databases that store data in a corresponding set of data files. A database may be a relational database, a NoSQL database, an object-oriented database, a time-series database, a columnar database, a distributed database, a graph database, etc. A data file may be a structured data file, a semi-structure data file, or an unstructured data file. Although three data sources are shown in FIG. 1, system 100 may include 2: n data sources.

Figure 5:
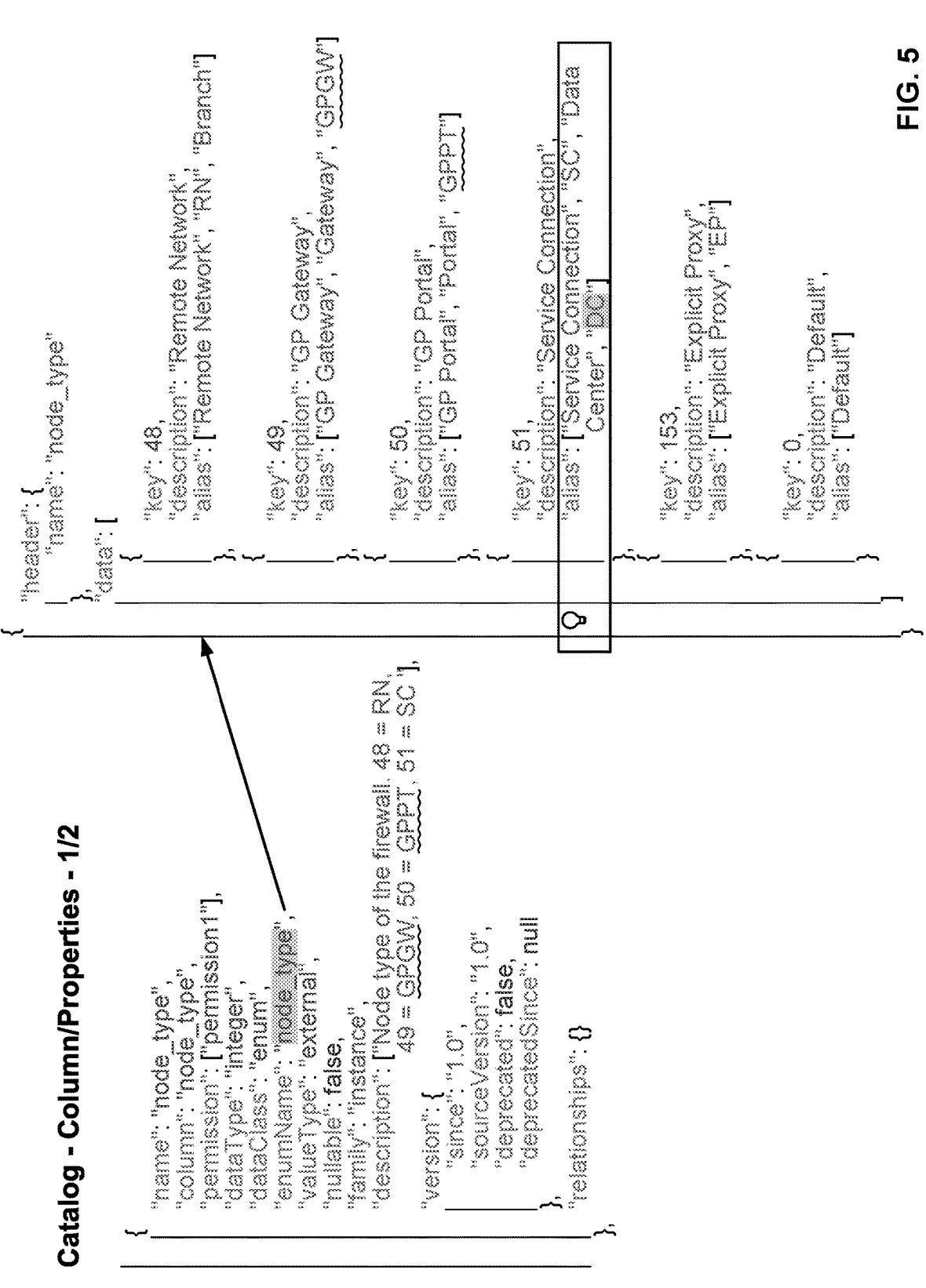
FIG. 5 illustrates an example of column information stored in a data catalog in accordance with some embodiments.

Data access platform 112 is configured to generate a corresponding data catalog for each of the data files. The data catalog provides contextual information (i.e., meta data on data columns), such as where the data is located, the meaning of the data within each column, permissions required to access the data file and column within the data file, expiry rules (if any), the type of data in the column, etc. An example of a data catalog is illustrated in FIG. 4. An example of column information stored in a data catalog is illustrated in FIG. 5. An example of property information associated with a column is illustrated in FIG. 6. The knowledge associated with a data file may get lost over time. A data file may be created and remain unused for an extended period of time. Users that generated the data file may leave an organization. The data catalog prevents the knowledge associated with a data file from being lost.

For example, a first data file associated with a first database in a first data store may include a column for "network quality". The column may include a plurality of values that range from 1-5. Without knowing if "1" or "5" is good or bad, the values in the column are meaningless unless the context of the data is known. A second data file associated with a second database in a second data store may also include a column for "network quality" and include a plurality of values that range from 1-5. Without knowing if "1" or "5" is good or bad, the values in the column are also meaningless. The data catalogs for the first and second data files allow a "1" value in the "network quality" column of the first data file to be compared to a "1" value in the "network quality" column of the second data file because the data catalogs provide contextual information associated with the data values (e.g., whether a "1" is good or bad.).

Figures 7, 8:
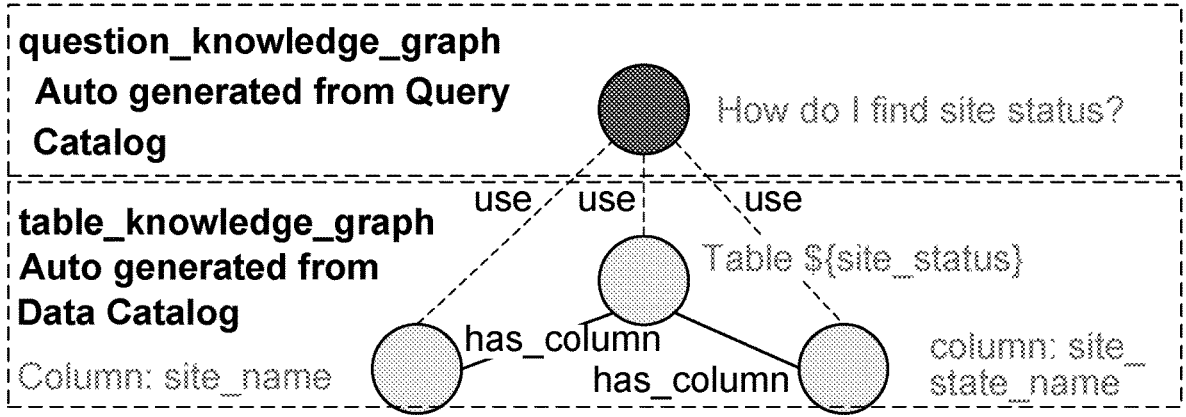
FIG. 7 illustrates an example of a knowledge graph in accordance with some embodiments.
FIG. 8 illustrates an example of an index for a knowledge graph in accordance with some embodiments.

Data access platform 112 is configured to generate and maintain a plurality of knowledge graphs 116. The plurality of knowledge graphs 116 capture the semantics of data, including relationships between different entities (such as columns) and tables. An example of a knowledge graph is illustrated in FIG. 7.

A knowledge graph includes a collection of edges, represented by (subject, predicate, object) tuple along with additional properties. The knowledge graph edges are stored in a table (e.g., BigQuery table). The subject, predicate, object properties and description are indexed and vector searchable through a data warehouse (e.g., Bigquery). AI engine 117 may include a Copilot service to leverage vector search to select relevant entities to the query. An example of an index for the knowledge graph of FIG. 7 is illustrated in FIG. 8.

A prompt received from a client device (e.g., laptop, server, computer, tablet, desktop, smartphone, smart device, etc.) may include natural language. Natural language prompts are often ambiguous. A knowledge graph helps resolve ambiguities by providing context and narrowing down possible interpretations.

In response to receiving a prompt from one of the client devices 102a, 102b, . . . , 102n, AI engine 117 is configured to determine which of the data catalogs 114 are relevant to the prompt by utilizing one or more of the knowledge graphs 116 and the data catalogs 114. A knowledge graph indicates the names of the columns that are relevant to the prompt.

A data catalog indicates whether a particular user is permitted to access a data file associated with the data catalog. Security monitor 115 is configured to utilize the one or more determined data catalogs to apply one or more security policies to determine if the particular user (e.g., the user providing the prompt) has permission to access the one or more data files associated with the one or more determined catalogs. In some embodiments, the one or more security policies indicate that a user associated with the client device has permission to access an entire portion of a data file. The data included in this data file may be utilized by AI Engine 117 to generate a query response.

In some embodiments, the one or more security policies indicate that a user associated with the client device has permission to access a portion of a data file. Depending on which portions of the data file the user is permitted to access, the data included in this data file may be utilized by AI Engine 117 to generate a query response. For example, the user may have permission to access the data associated with a first column, but not have permission to access data associated with a second column. If the data associated with the first column is relevant to a query, then the data included in the first column can be utilized by AI Engine 117 to generate a query response. However, if the data associated with the second column is relevant to the query, then the data included in the second column may not be utilized by AI Engine 117 to generate a query response. In some embodiments, data associated with the second column may be utilized by AI Engine 117, but is masked or anonymized to prevent the leakage of private information.

In some embodiments, the one or more security policies indicate that a user associated with the client device does not have permission to access a data file. The data included in this data file may not be utilized by AI Engine 117 to generate a query response.

The data in the matching columns may be normalized using the one or more determined data catalogs. For example, an example query may be "how is the network quality across my datacenters?" AI Engine 117 may utilize a first data catalog corresponding to the first data file associated with the first database in the first data store to determine if a "1" or "5" value is good or bad and a second data catalog corresponding to the second data file associated with the second database in the second data store to determine if a "1" or "5" value is good or bad. A "1" value may be "good" in the first data file while a "1" value may be "bad" in the second data file. In some embodiments, AI Engine 117 normalizes the data in the first data file such that a "1" value corresponds to a "bad" value. In some embodiments, AI Engine 117 normalizes the data in the second data file such that a "1" value corresponds to a "good" value.

In some embodiments, AI Engine 117 does not normalize the data because the data in the matching columns is consistent.

AI Engine 117 includes a large language model (LLM). The large language model is configured to generate a structured query language (SQL) command to retrieve data from one or more data files with which the user has permission to access. The knowledge graph(s) used to determine which of the data catalogs are relevant to the query improves the accuracy of SQL generation to locate the data to answer the query by guiding the LLM on which entities and relationships are relevant to the query.

The LLM generates a query response based on executing the SQL command and extracting the data from one or more data files. The client device that provided the prompt may access the data associated with the query response. In some embodiments, the client device accesses the data associated with the query response using an API. In some embodiments, the client device assesses the data associated with the query response using an LLM query interface.

In some embodiments, the client device accesses the data associated with the query response via one or more dashboards generated by data visualizer 118. As seen in FIG. 9A,

6

Figure 10:
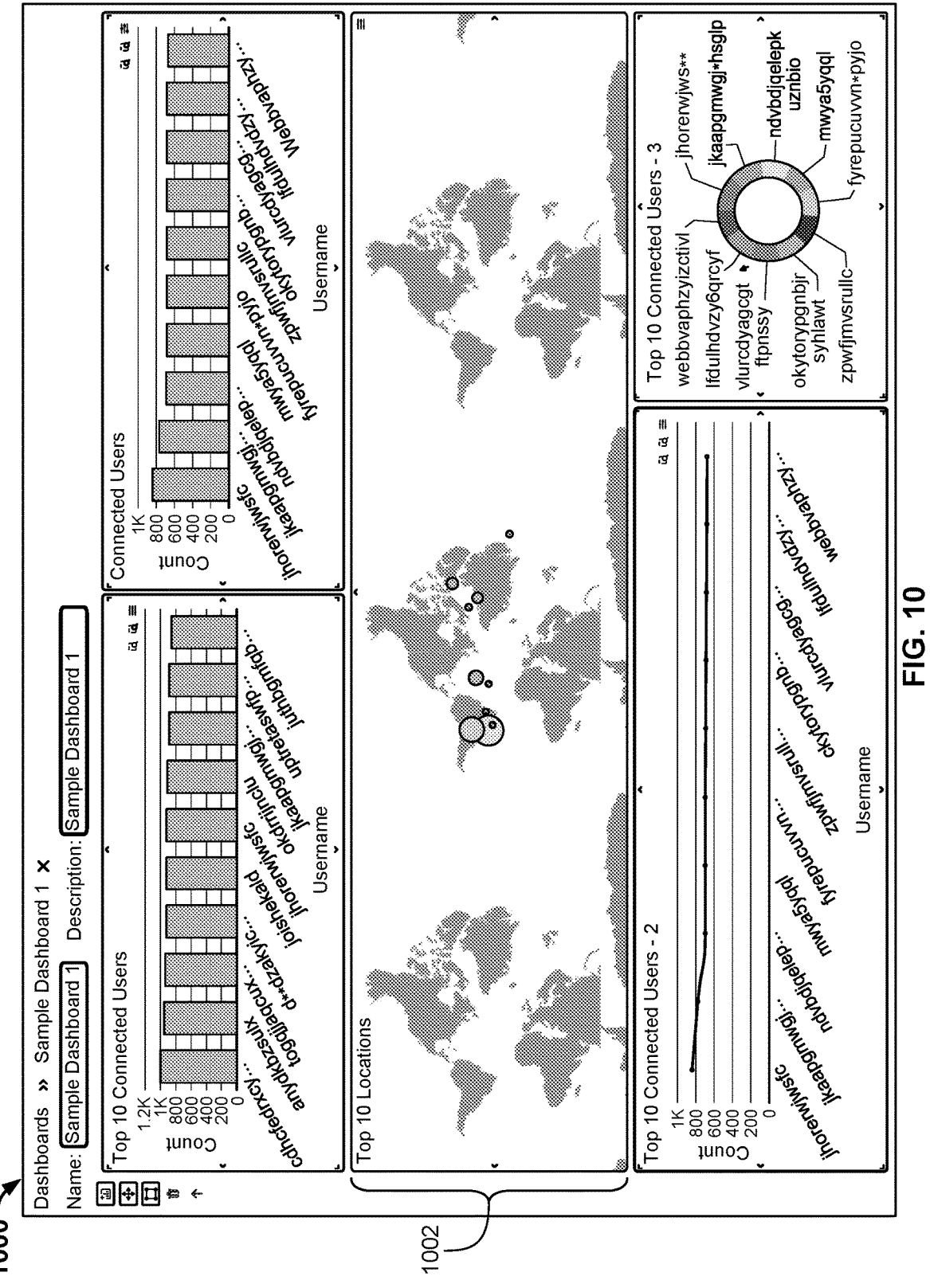
FIG. 10 illustrates an example of a dashboard in accordance with some embodiments.
Figure 11:
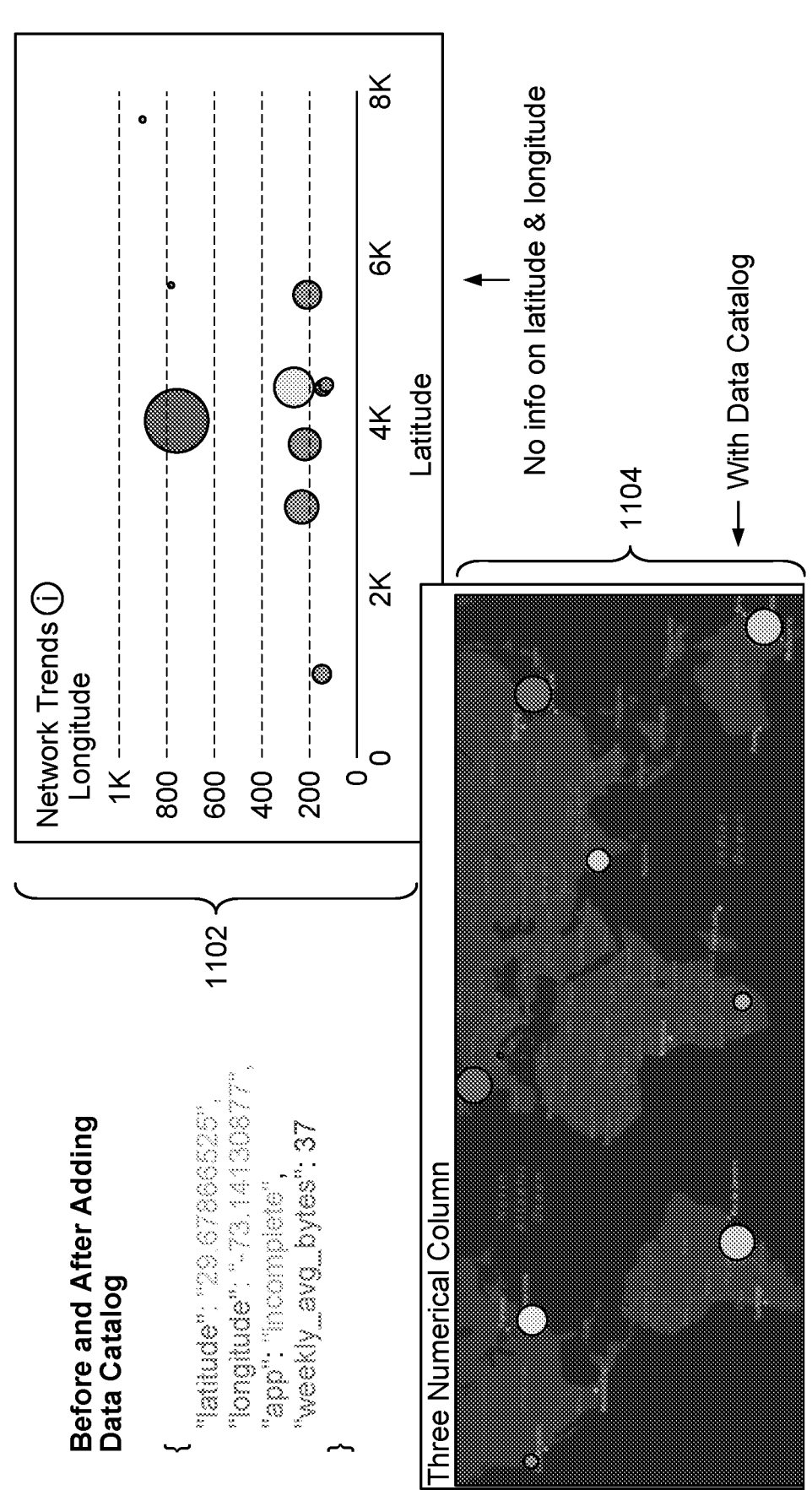
FIG. 11 illustrates an example of a dashboard generated before and after adding a data catalog in accordance with some embodiments.

UI 900 includes an input box 902. As seen in FIG. 9B, a user may enter in the prompt "create a dashboard for users and pa locations." Data visualizer 118 in conjunction with AI engine 117 generates a query response in the form of a dashboard that includes a plurality of widgets in response to button 904 being selected. FIG. 10 depicts an example dashboard 1000 generated for the prompt "create a dashboard for users and pa locations." AI Engine 117 is configured to select the best widget to display "users and pa locations" based on the one or more data catalogs associated with the one or more data files. For example, a table may include columns that store values without any meaning. A data catalog associated with the column may indicate the meaning associated with the columns. For example, the data catalog may indicate the values in a first column are latitude coordinates, the values in a second column are longitude coordinates, the values in a third column are a status associated with an app, and the values in a fourth column are the weekly average bytes for that location. Instead of using a scatterplot widget 1102 as seen in FIG. 11, AI Engine 117 may determine to use a map widget 1104 to show "users and pa locations." This allows users to view their data in a preferred format without having to explicitly state how the data should be presented.

Figure 13:
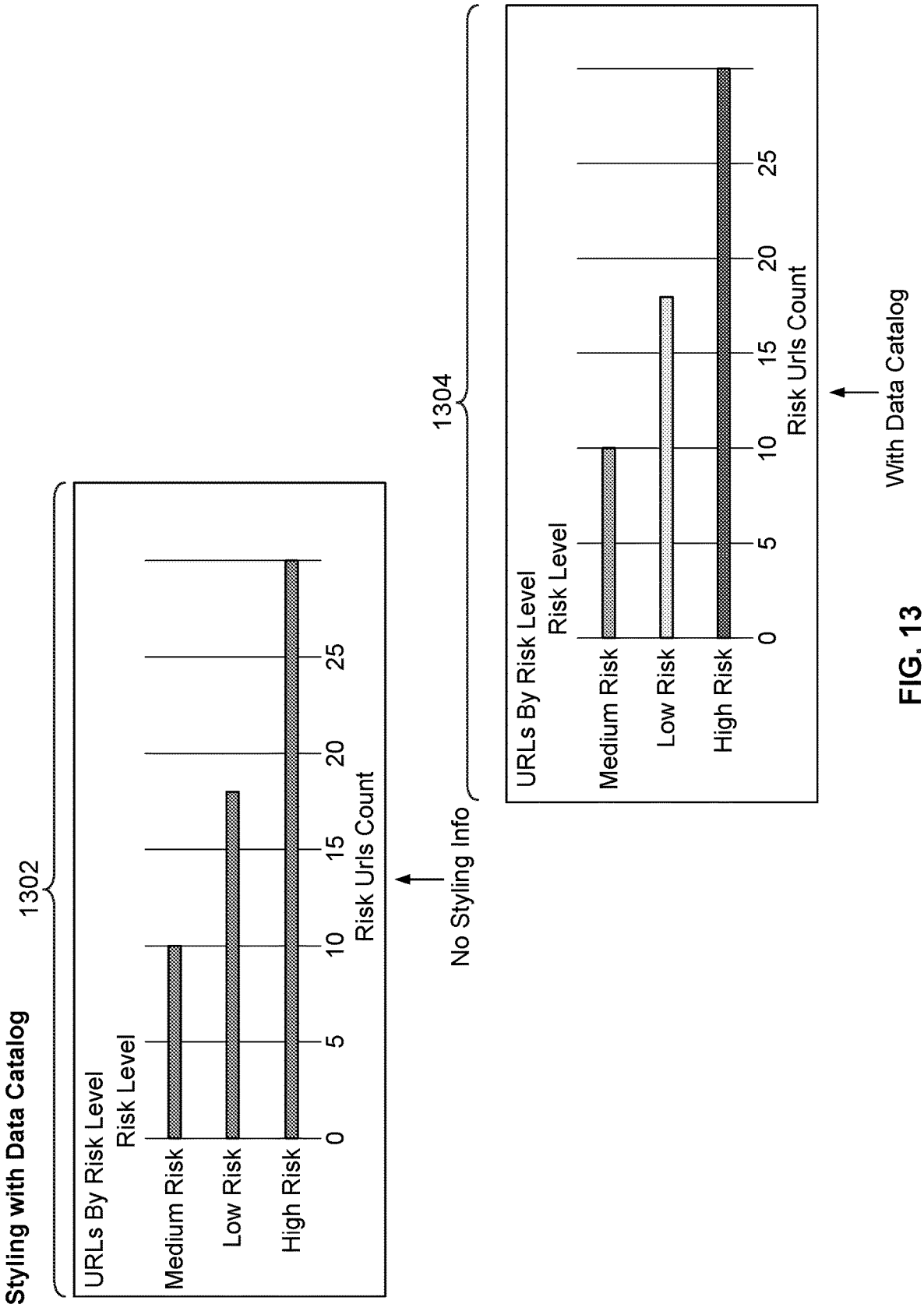
FIG. 13 illustrates an example of a dashboard generated with and without a data catalog having styling information in accordance with some embodiments.

In another example, the data catalog may indicate colors associated with different risk values. Instead of generating dashboard 1302 depicting the risk levels having the same color as seen in FIG. 13, the data catalog depicted in FIG. 12 may be utilized by data visualizer 118 to generate dashboard 1304 where the different risk levels have different colors.

Figure 14:
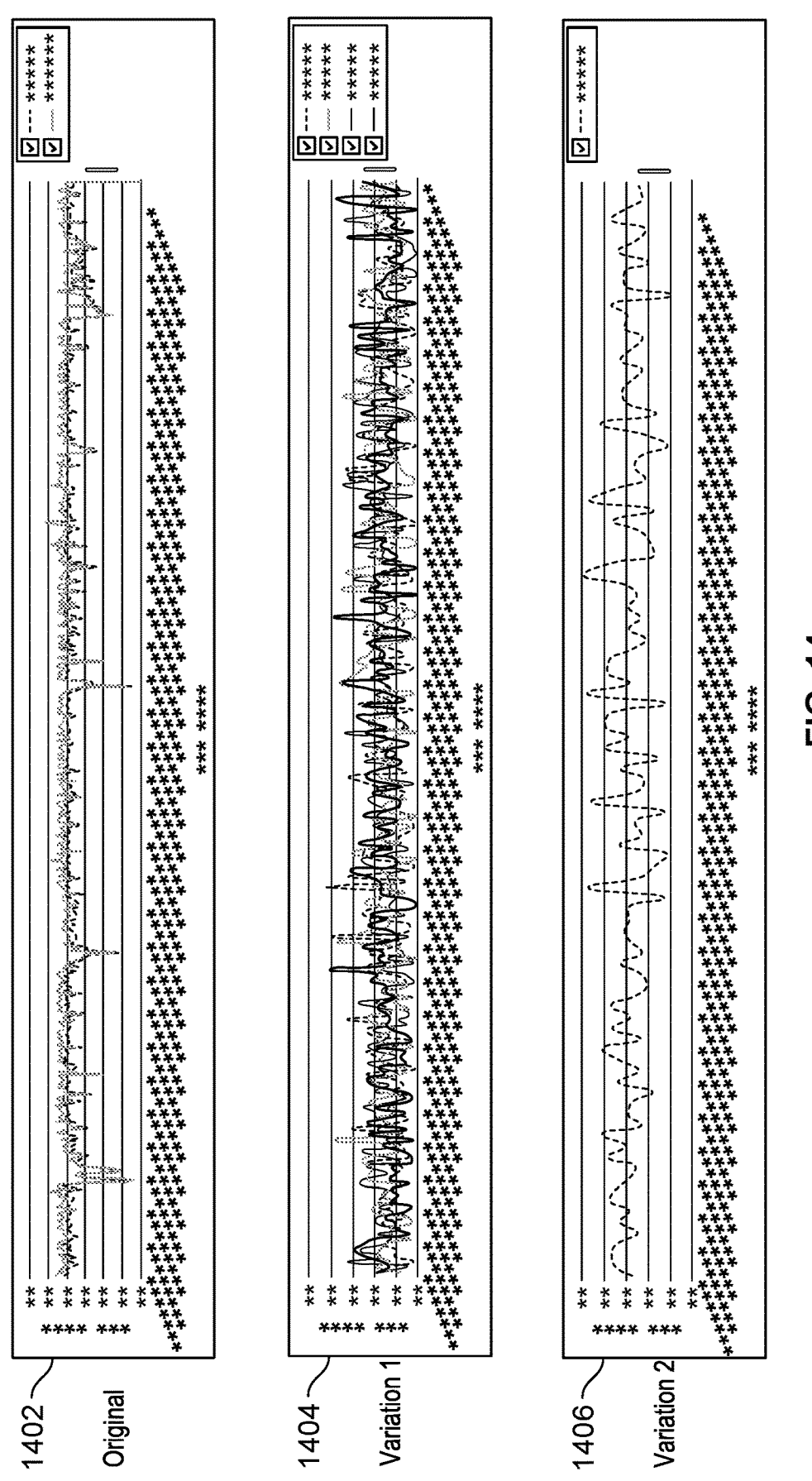
FIG. 14 illustrates an example of synthetic data in accordance with some embodiments.
Figure 14:
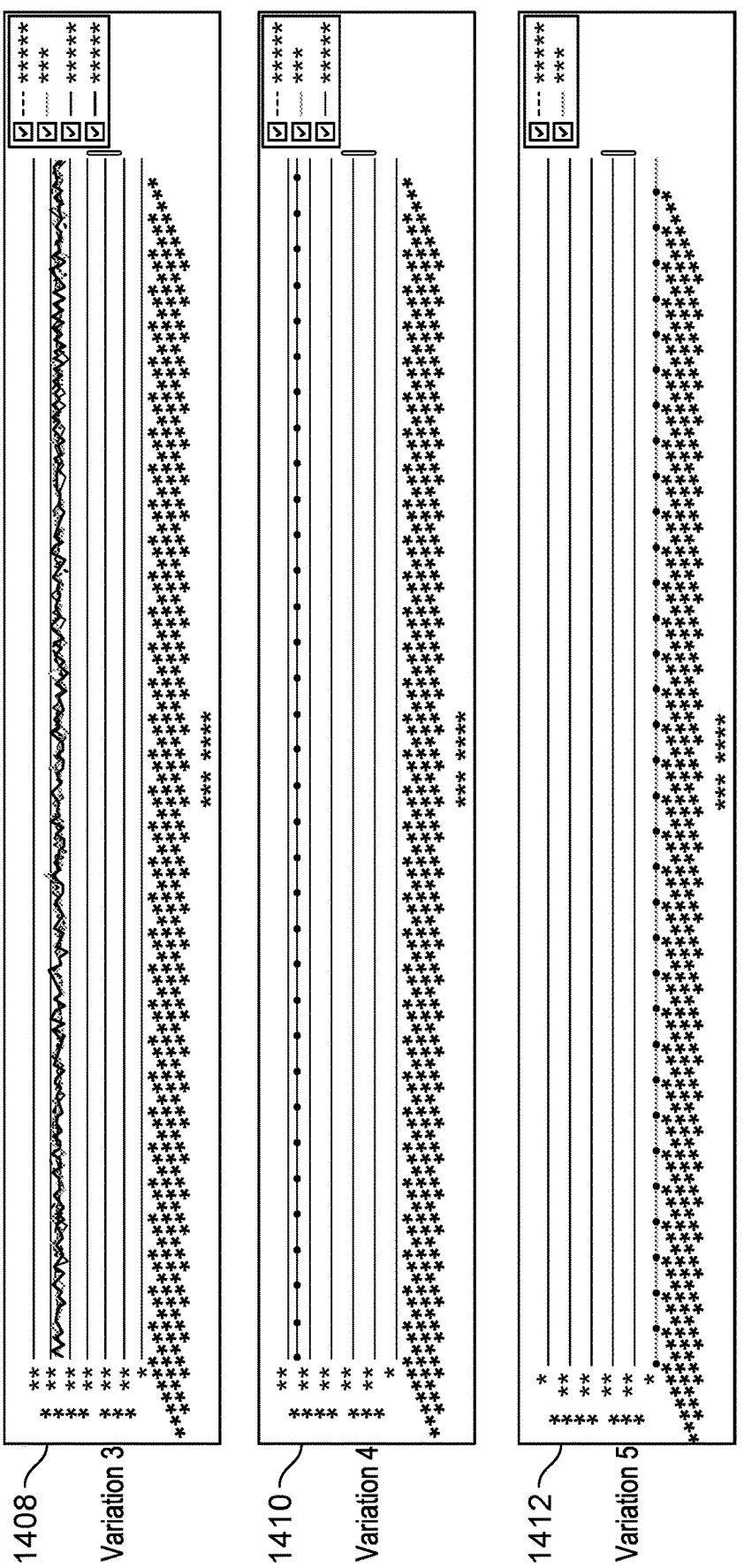

In some embodiments, synthetic data generator 113 utilizes one or more of the data catalogs 114 to generate synthetic data for one or more different use cases. FIG. 14 illustrates an example of synthetic data. In the example shown, the original data 1402 is displayed. Synthetic data generator 113 is configured to generate one or more variations, such as variation 1404, variation 1406, variation 1408, variation 1410, and variation 1412. In some embodiments, a variation is an outlier or edge-case observation.

Synthetic data generator 113 enables users to validate a data schema and query scalability, test data queries with various data distributions, generate data to emulate certain test scenarios and validate the dashboards, and visualize results on the queries and revise the user interface for best customer experience. By creating synthetic variations of the data, edge case observations that uncovered bugs in the algorithm may be generated.

Figure 2:
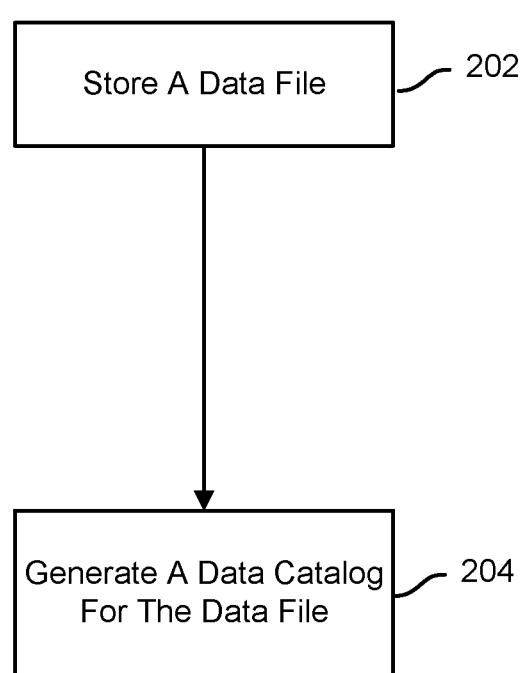
FIG. 2 is a flow diagram illustrating a process to bridge data stored in disparate data stores in accordance with some embodiments.

FIG. 2 is a flow diagram illustrating a process to bridge data stored in disparate data stores in accordance with some embodiments. In the example shown, process 200 may be implemented by a data access platform, such as data access platform 112.

At 202, a data file is stored. The data file is stored in a data store. A data source for the data file may be a cloud delivered security source (CDSS), an on-prem security product (e.g., firewall), a security access service edge (SASE) cloud-delivered platform, a cloud next-generation firewall, a centralized management platform, a cloud management platform, etc.

At 204, a data catalog is generated for the data file. The data catalog provides meta data for the data included in the data file. The data catalog provides contextual information (i.e., meta data on data columns), such as where the data is located, the meaning of the data within each column, permissions required to access the data file and column within the data file, expiry rules (if any), the type of data in the column, etc.

Figure 3:
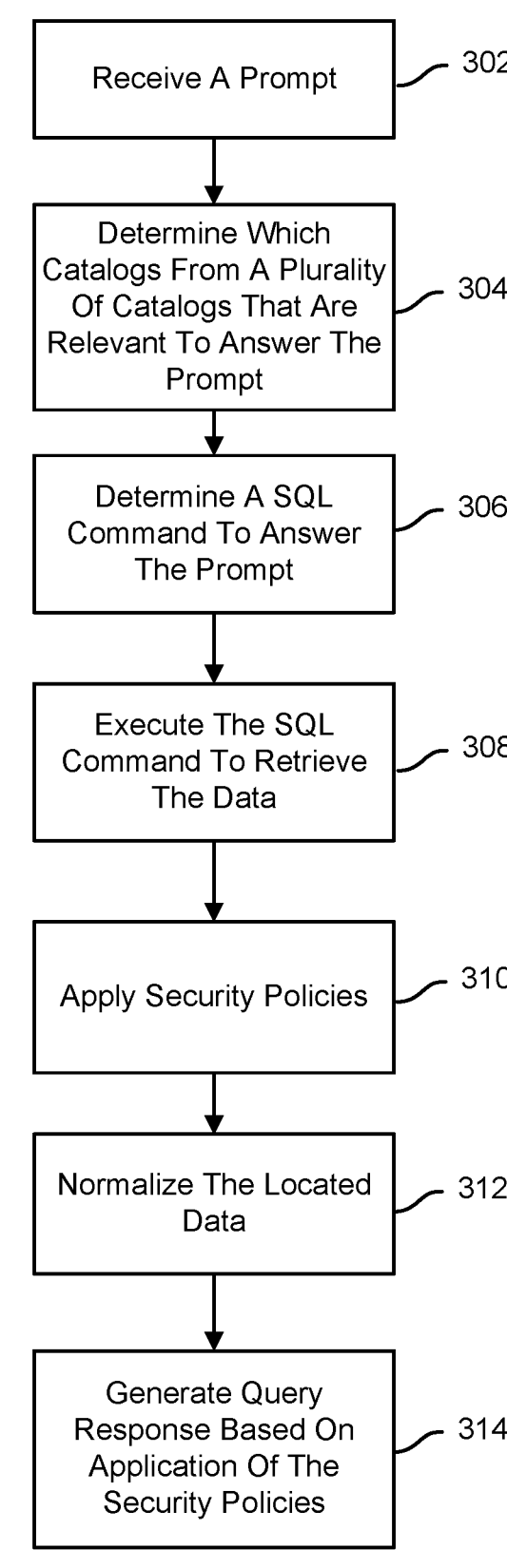
FIG. 3 is a flow diagram illustrating a process to generate a query response in accordance with some embodiments.

FIG. 3 is a flow diagram illustrating a process to generate a query response in accordance with some embodiments. In the example shown, process 300 may be implemented by a data access platform, such as data access platform 112.

At 302, a prompt is received. The prompt includes natural language.

At 304, one or more data catalogs that are relevant to answer the prompt are determined. Natural language prompts are often ambiguous. One or more knowledge graphs are utilized to determine which data catalogs are relevant to the prompt. A knowledge graph indicates the names of the columns that are relevant to the prompt. The one or more data catalogs that include columns matching the names of column(s) indicated by the knowledge graph are determined. The data catalogs, the knowledge graphs, and the prompt are provided to an LLM to determine which of the data catalogs are relevant to answer the prompt.

At 306, a SQL command to answer the prompt is determined. A request to generate a SQL command for the prompt is provided to the LLM. In response to receiving the request, the LLM generates a SQL command based on the determined data catalogs.

At 308, the SQL command is executed to retrieve the data from one or more data files associated with the determined data catalogs. The retrieved data is included in a table that includes one or more rows and one or more columns.

At 310, one or more security policies are applied to the retrieved data. One or more data catalogs associated with the one or more determined data files indicate whether a particular user is permitted to access a data file. The one or more data catalogs associated with the one or more determined data files are utilized to apply one or more security policies to the table that includes the retrieved data. Th one or more security policies may be applied at a data file level or a column level.

In some embodiments, the one or more security policies indicate that a user associated with the client device has permission to access an entire portion of a data file. The data included in this data file may be utilized to generate a query response.

In some embodiments, the one or more security policies indicate that a user associated with the client device has permission to access a portion of a data file. Depending on which portions of the data file the user is permitted to access, the data included in this data file may be utilized to generate a query response. For example, the user may have permission to access the data associated with a first column, but not have permission to access data associated with a second column. If the data associated with the first column is relevant to the query, then the data included in the first column can be utilized to generate a query response. However, if the data associated with the second column is relevant to the query, then the data included in the second column may not be utilized to generate a query response and removed from the table that includes the retrieved data.

At 312, data included in the table is normalized. The data in a plurality of columns may be normalized so that the data is consistent with each other. In some embodiments, step 312 is optional because the data needed to answer the query is consistent.

At 314, a query response is generated and provided. The query response includes the data in the table after the one or more security policies are applied and the data in the table is normalized (if necessary). The client device that provided the prompt may access the data associated with the query response. In some embodiments, the client device accesses the data associated with the query response using an API. In some embodiments, the client device assesses the data associated with the query response using an LLM query interface. In some embodiments, the client device accesses the data associated with the query response via one or more dashboards generated by a data visualizer. In some embodiments, the query response is provided via an electronic communication (e.g., text message, e-mail, etc.). In some embodiments, the query response is provided in a word processing document, a spreadsheet, a slide deck, a report, an audio file, a video file, etc. In some embodiments, the query response is a workflow.

Data Visualization

Current data visualizers output static dashboards. A data analyst or data scientist receives a dashboard specification and generates a dashboard to meet the dashboard specification. The dashboard may include one or more widgets. Regardless of the user viewing the dashboard, the dashboard outputs the same information. A first user may desire to see more information associated with a first widget included in the dashboard while a second user may desire to see more information associated with a second widget included in the dashboard. However, neither the first user nor the second user can view their desired information unless the data analyst or data scientist that created the dashboard, explicitly programmed the dashboard to display the desired information. This limits the usefulness of dashboards. Furthermore, additional time and resources are needed to generate a new dashboard that meets the specific requirements of the first and second users.

Figure 15:
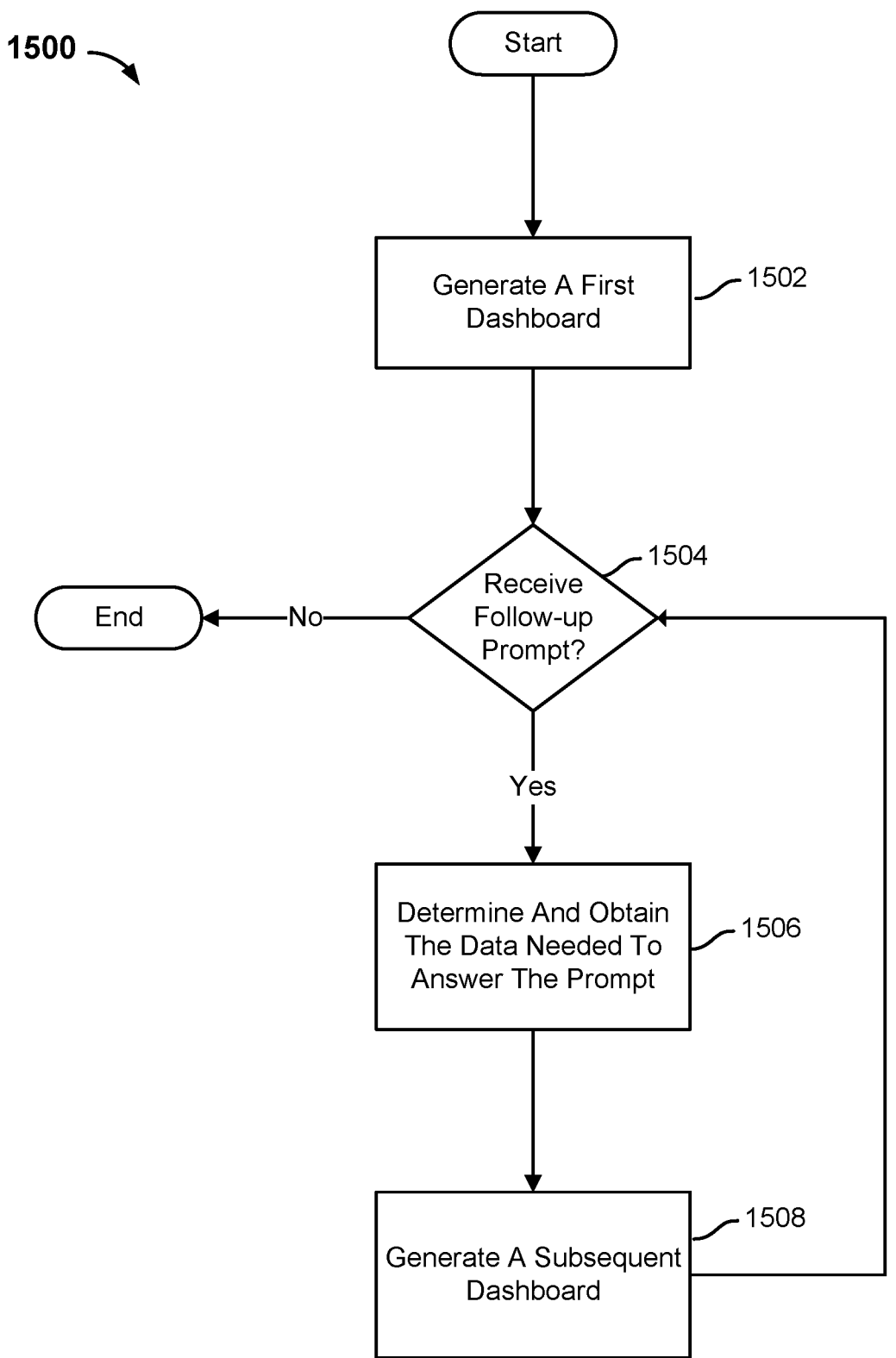
FIG. 15 is a flow diagram illustrating a process to generate customized dashboards in accordance with some embodiments.

FIG. 15 is a flow diagram illustrating a process to generate customized dashboards in accordance with some embodiments. In the example shown, process 1500 may be implemented by a data access platform, such as data access platform 112.

At 1502, a first dashboard is generated.

In some embodiments, the first dashboard is generated based on a received prompt. The received prompt may include natural language. For example, a user may enter a prompt into input box 902 and select button 904. The first dashboard is generated based in part on the natural language included in the prompt.

In some embodiments, the first dashboard is generated using a machine learning model and user settings associated with the user. For example, a user may select button 908 of FIG. 9A and the first dashboard is generated based on the user settings associated with the user. The prompt and the user settings associated with the user are provided to a machine learning model. The user settings are learned over time. For example, the user settings indicate the types of queries the user is asking, the type of information the user is interested in viewing in a dashboard with respect to the different query types, the types of widgets used to visualize the information, the configuration of the widgets on the dashboard, the size of the widgets on the dashboard, etc. A dashboard may be created for a user and a user may provide feedback indicating that an incorrect widget was utilized to visualize data. For example, the user may indicate that a bar graph should have been used to visualize the data instead of a pie chart. The user settings associated with the user are updated in response to receiving feedback from the user. In some embodiments, the machine learning model is a supervised model, an unsupervised model, a semi-supervised model, a self-supervised model, reinforcement model, an evolutionary learning model, etc.

In some embodiments, the first dashboard is a custom dashboard generated based on a series of inputs provided by the user. For example, a user may select button 906 and generate a custom dashboard configuration as seen in FIGS. 17A-17M.

At 1504, it is determined whether a follow-up prompt is received. The user may desire to see additional information not displayed by the first dashboard. The first dashboard may include an input box that allows the user to provide the follow-up prompt, which may refine the initial query, adjust parameters, and/or apply filters on the fly. The follow-up prompt may include natural language, making the data visualizer tool accessible to users with varying technical backgrounds and expertise.

In response to a determination that a follow-up prompt is received, process 1500 proceeds to 1506. In response to a determination that a follow-up prompt is not received, process 1500 ends.

At 1506, the data needed to answer follow-up prompt is determined and obtained. The data needed to answer the follow-up prompt may be stored in one or more disparate data stores. The follow-up prompt includes natural language. One or more knowledge graphs are obtained based on the words or phrases included in the natural language query and utilized to determine which data catalogs are needed to answer the follow-up query. The data catalogs are provided to an LLM and the LLM generates a SQL command to obtain the data needed to answer the follow-up prompt from the one or more disparate data stores. The LLM obtains one or more data files. One or more security policies may be applied to the one or more data files. The data needed to answer the follow-up prompt may be normalized, if necessary, by utilizing the corresponding data catalogs associated with the data files.

At 1508, a subsequent dashboard for the follow-up query is generated. A data visualizer utilizes machine learning and user settings associated with the user to generate the subsequent dashboard. In some embodiments, the data visualizer implements a reinforcement learning model (e.g., value-based model, policy-based model, actor-critic model, model-based reinforcement learning model, etc.) to generate the subsequent dashboard. In other embodiments, the data visualizer implements a supervised model, an unsupervised model, a semi-supervised model, a self-supervised model, an evolutionary learning model, etc.

After the subsequent dashboard is generated, process 1500 returns to 1504. The subsequent dashboard provides immediate visual feedback, enabling iterative data exploration and providing valuable insights. The ability to generate and update visualizations in real-time based on user prompts empowers users to explore data from different perspectives, facilitating a comprehensive understanding of complex datasets. The interconnected nature of the dashboard enables users to uncover correlations and relationships between different data points, enhancing their insights and decision-making capabilities.

This improves the usefulness of dashboards since the information that may be visualized is no longer static. Furthermore, the time and resources needed to generate a new dashboard is reduced.

Figure 16A:
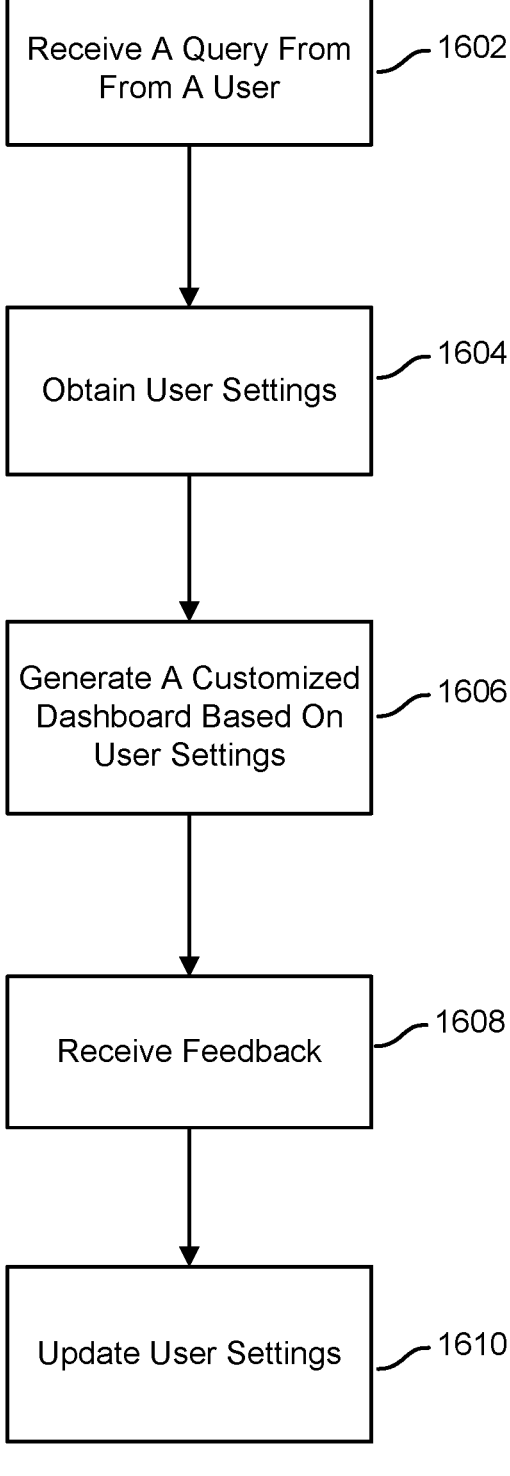
FIG. 16A is a flow diagram illustrating a process to update and maintain a machine learning model associated with a user in accordance with some embodiments.

FIG. 16A is a flow diagram illustrating a process to update and maintain a machine learning model associated with a user in accordance with some embodiments. In the example shown, process 1600 may be implemented by a data access platform, such as data access platform 112.

At 1602, a prompt is received from a user.

At 1604, user settings are obtained. The user settings are learned over time. For example, the user settings indicate the types of queries the user is asking, the type of information the user is interested in viewing in a dashboard with respect to the different query types, the types of widgets used to visualize the information, the configuration of the widgets on the dashboard, the size of the widgets on the dashboard, etc.

At 1606, a customized dashboard is generated for the user based on the user settings. The machine learning model enables a dashboard that is context aware and personalized for the user to be generated. The customized dashboard may be generated without the user providing explicit instructions yet display the information the user wants to see in the types of widgets most effective in displaying the information. The user settings and the query response are provided to the machine learning model. In response, the machine learning model generates the customized dashboard.

Figure 16B:
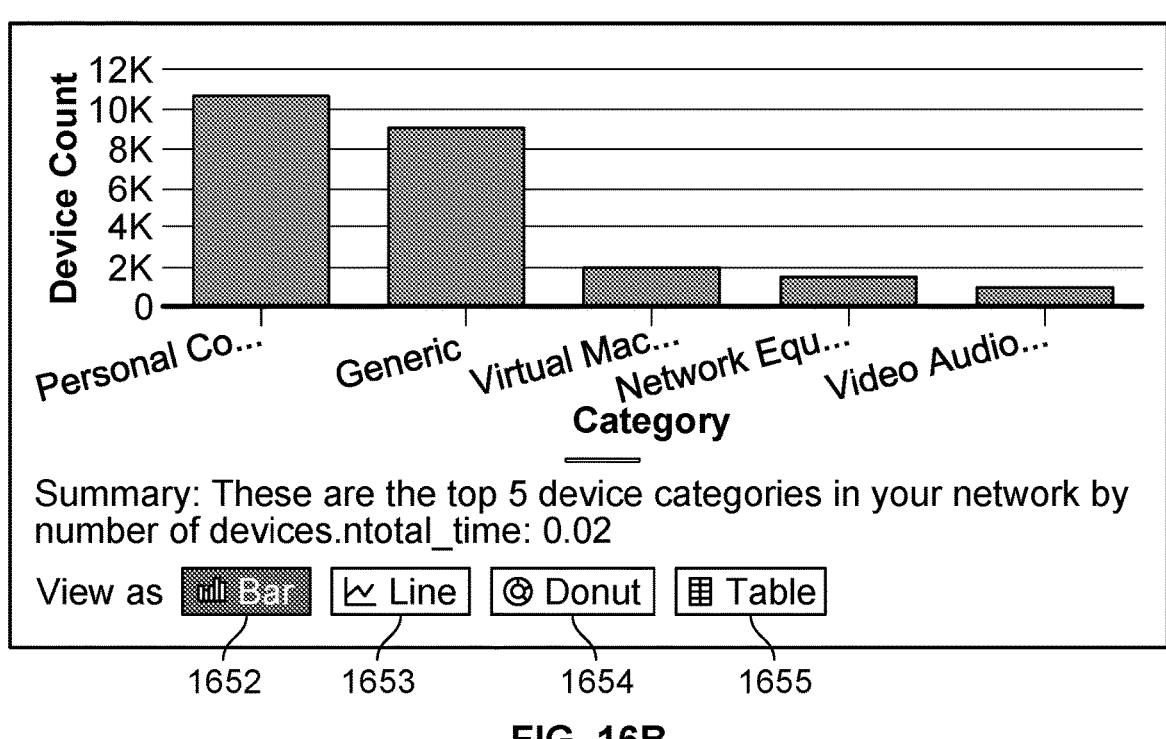
FIG. 16B illustrates an example of a customized dashboard in accordance with some embodiments.
Figure 16C:
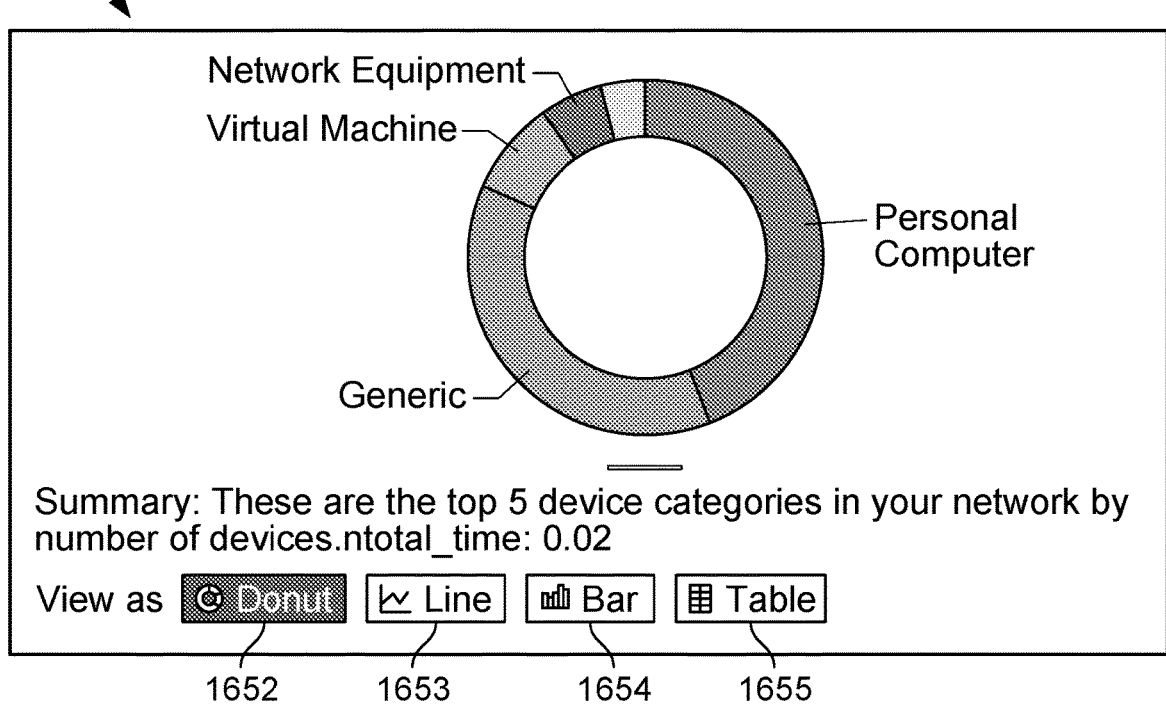
FIG. 16C illustrates an example of a customized dashboard receiving feedback in accordance with some embodiments.

At 1608, feedback is received. For example, the customized dashboard may include the widget 1650 show in FIG. 16B. Widget 1650 includes buttons 1652, 1653, 1654, 1655. Button 1652 is highlighted to indicate the data associated with a query of "top 5 device categories in my network by number of devices" is shown as a bar graph. The user may provide feedback by selecting button 1654. In response, widget 1650 is updated, as seen in FIG. 16C, widget 1650 has been updated to widget 1670 to visualize the data as a donut graph.

In some embodiments, step 1608 is optional because the user did not provide any feedback, that is, the generated customized dashboard meets the user's expectations.

At 1610, user preferences are. The user settings may be updated after each customized dashboard is generated to improve the generation of one or more subsequent dashboard, that is, the generation of one or more subsequent dashboards will take into account the feedback provided by the user, which was not taken into account in the generation of the current customized dashboard. In some embodiments, step 1610 is optional because the user did not provide any feedback. Thus, the user settings do not need to be updated.

Figure 17A:
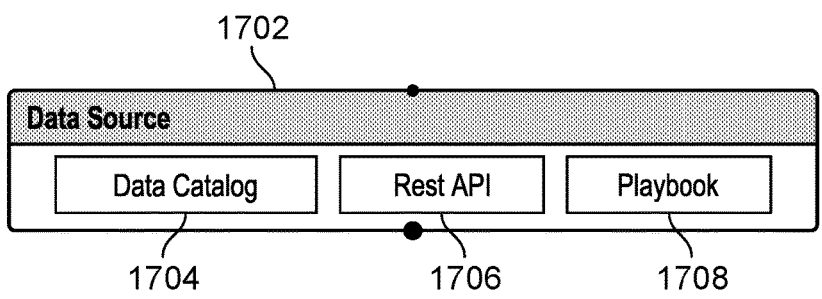
FIGS. 17A-17L illustrate a process to generate a customized dashboard in accordance with some embodiments.

FIG. 17A is a diagram illustrating a user interface to generate a customized dashboard in accordance with some embodiments. In the example shown, a user may generate their own customized dashboard in response to selecting button 906 of FIG. 9A. The user may select a data source 1702 to provide data for generating the customized dashboard. In some embodiments, the selected data source is data catalog 1704. In some embodiments, the selected data source is rest API 1706. In some embodiments, the selected data source is playbook 1708. Playbook 1708 includes code (e.g., Java or Python code) that provides instructions on how to retrieve the data.

Figure 17B:
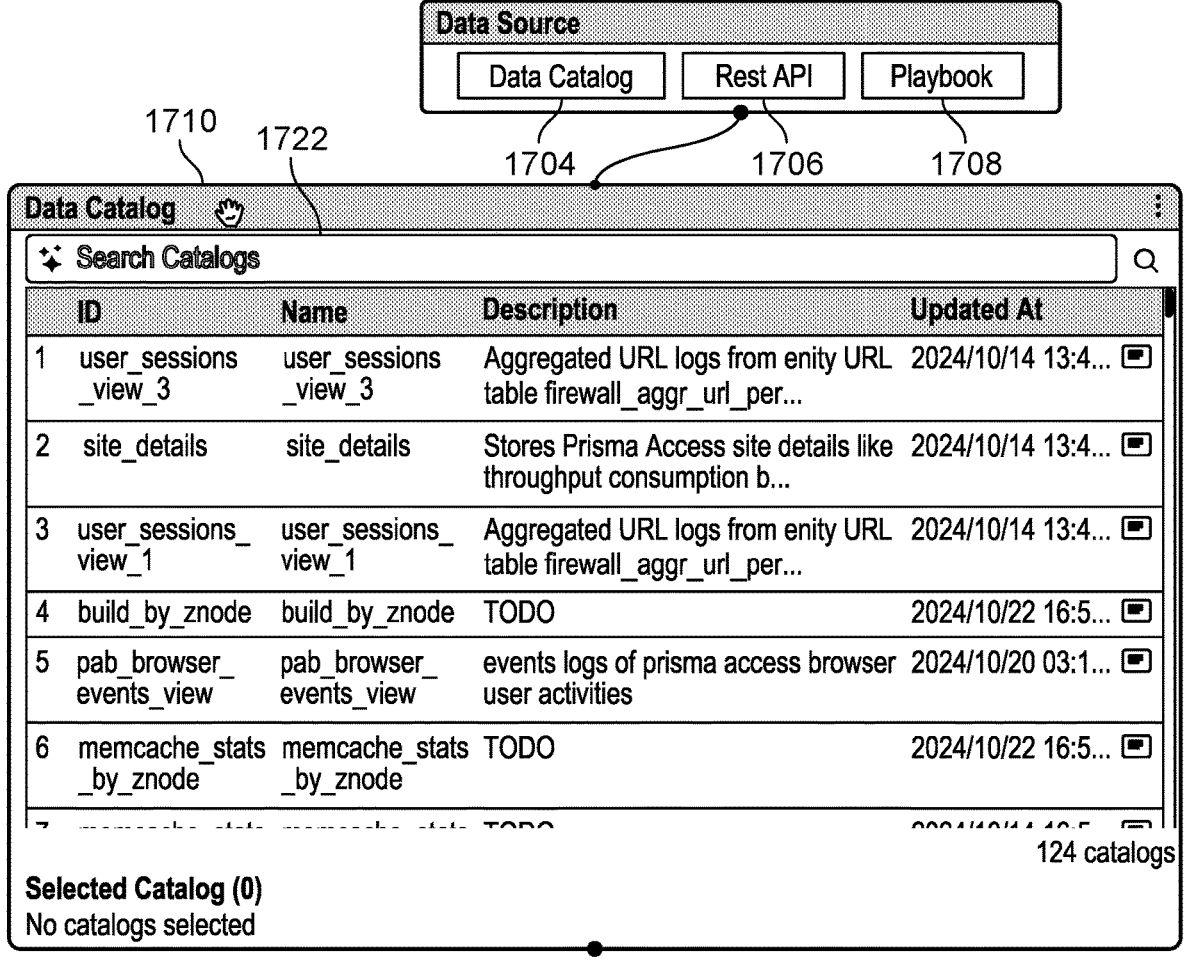
Figures 17C, 17D:
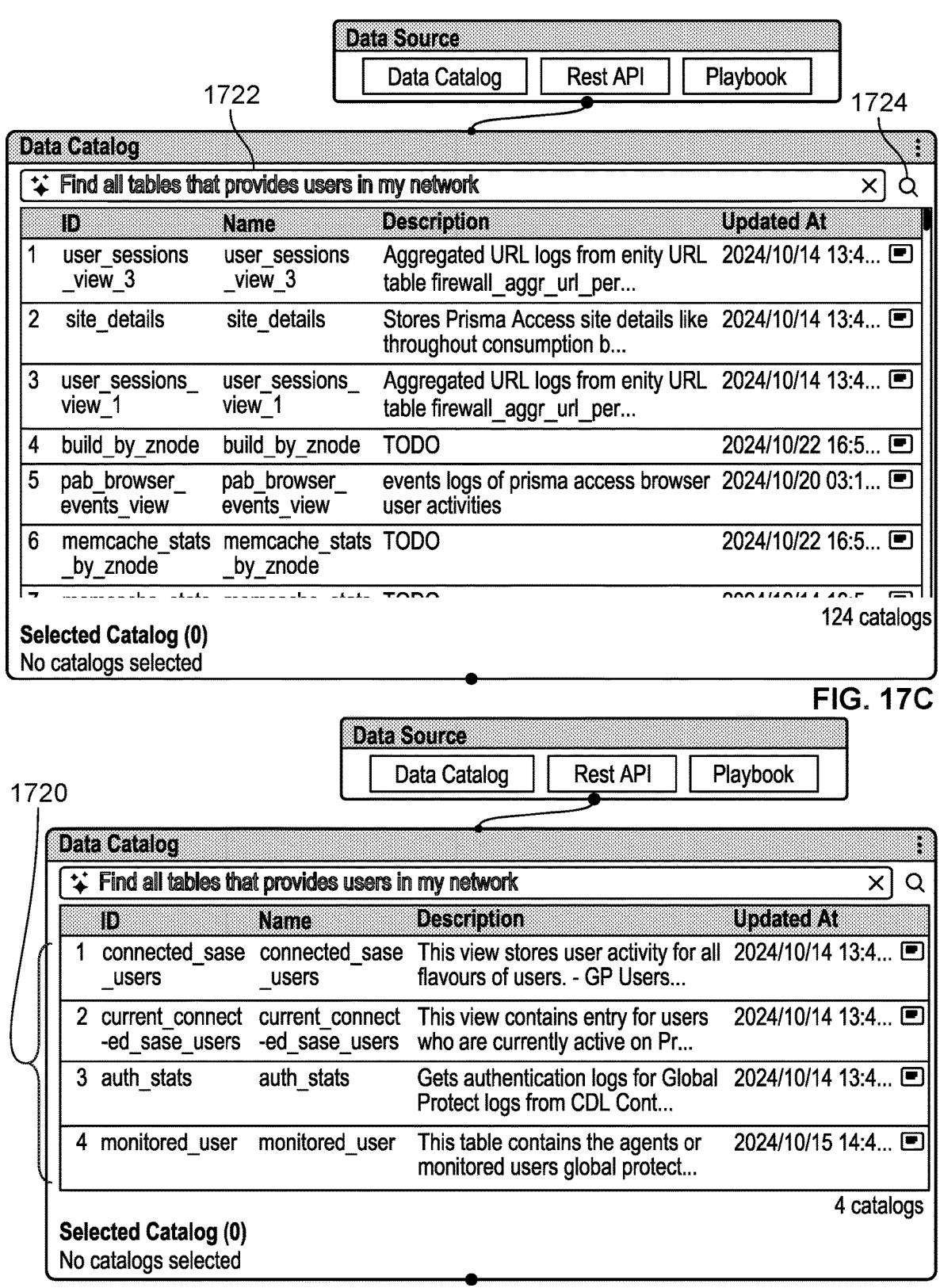

In response to selecting "data catalog 1704," a list of available data catalogs 1710, as seen in FIG. 17B, is displayed. The user may enter a data catalog filter into input box 1722. As seen in FIG. 17C, the user has entered a data catalog filter of "Find all tables that provides users in my network" into input box 1722. In response to selecting search button 1724, the list of available data catalogs 1710 is filtered, as seen in FIG. 17D, to be a list of relevant data catalogs 1720.

Figures 17E, 17F:
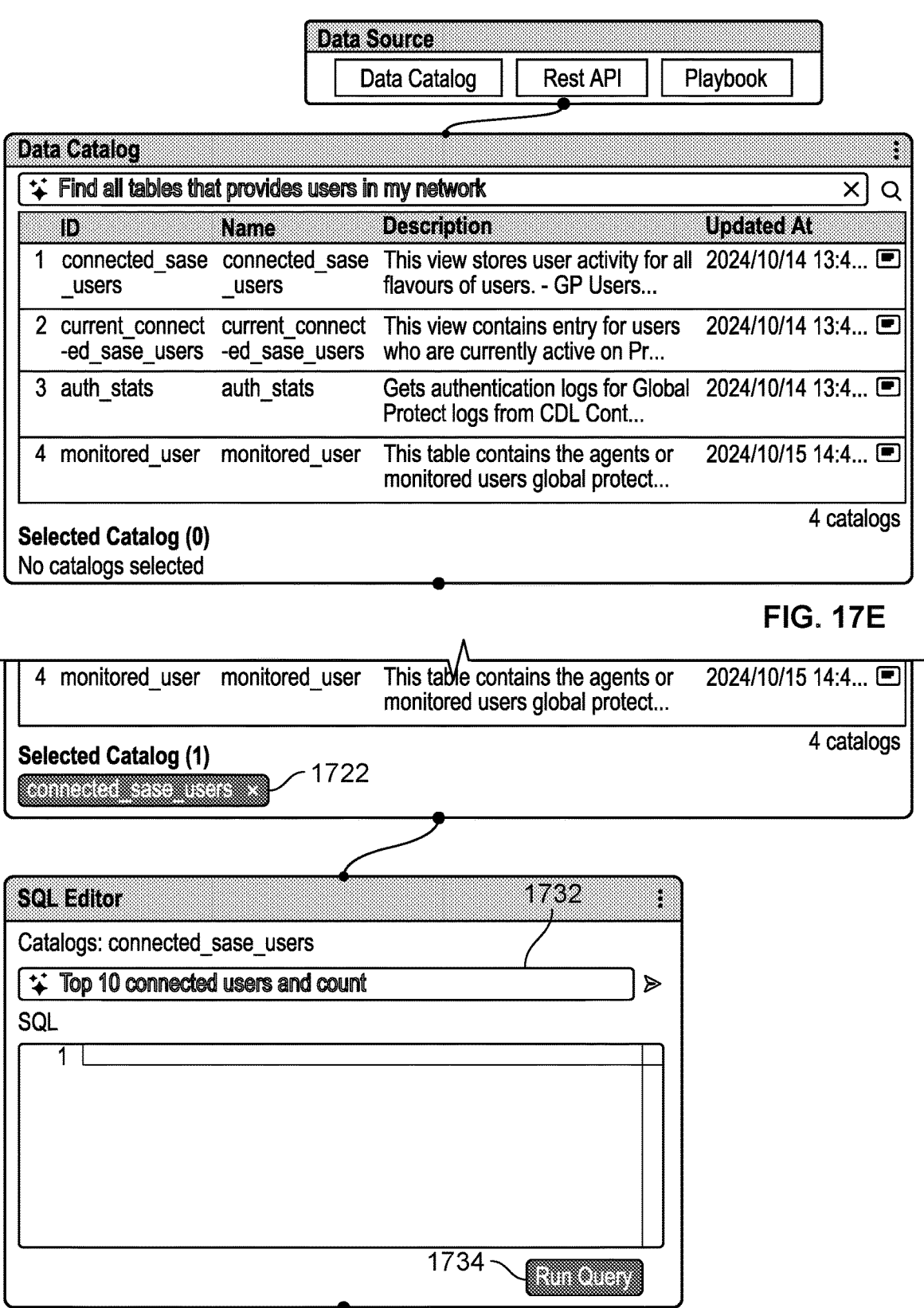

The user may select one or more of the relevant data catalogs 1720 from which to utilize to generate a customized dashboard. As seen in FIG. 17E, the user has selected data catalog 1722.

Figure 17G:
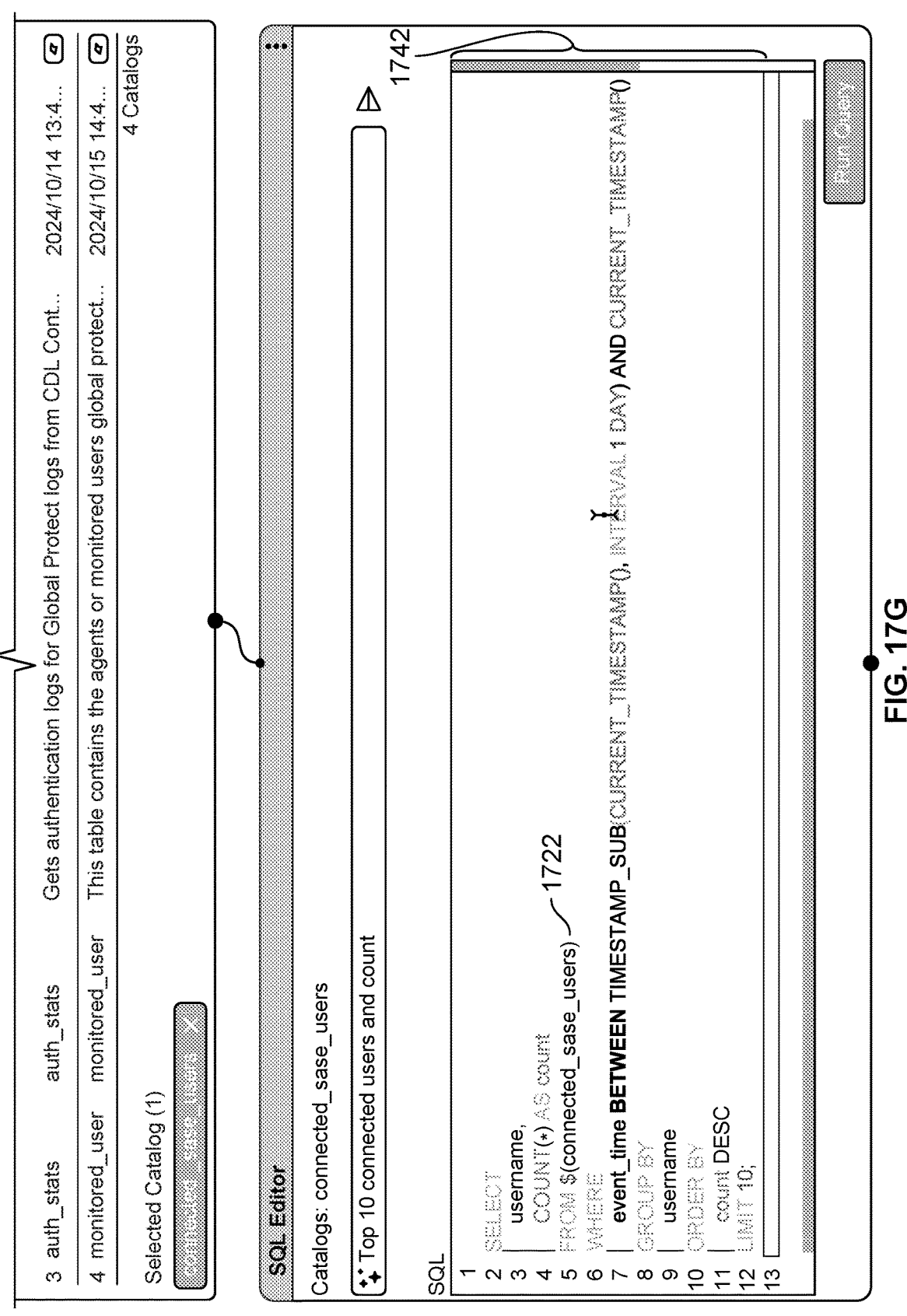
Figure 17H:
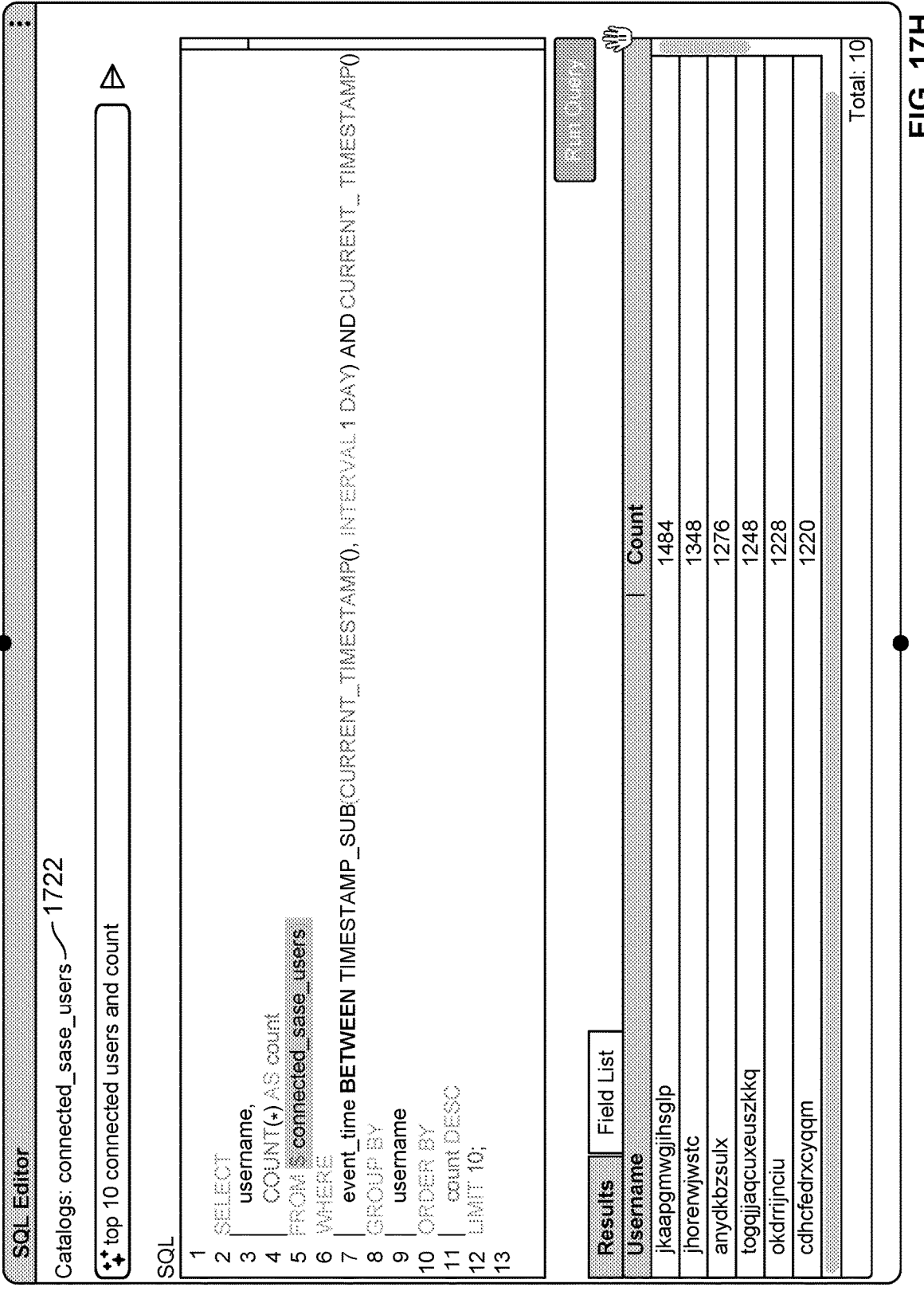

The user may enter a natural language query into input box 1732. As seen in FIG. 17F, the user has entered in a query of "Top 10 connected users and count" into input box 1732. In response to selecting query button 1734, as seen in FIG. 17G, the LLM generates a SQL command 1742 to obtain the data. As seen in FIG. 17H, the LLM obtains the data that answers the user's query. In the example shown, the top 10 users and their corresponding counts are displayed.

Figure 17I:
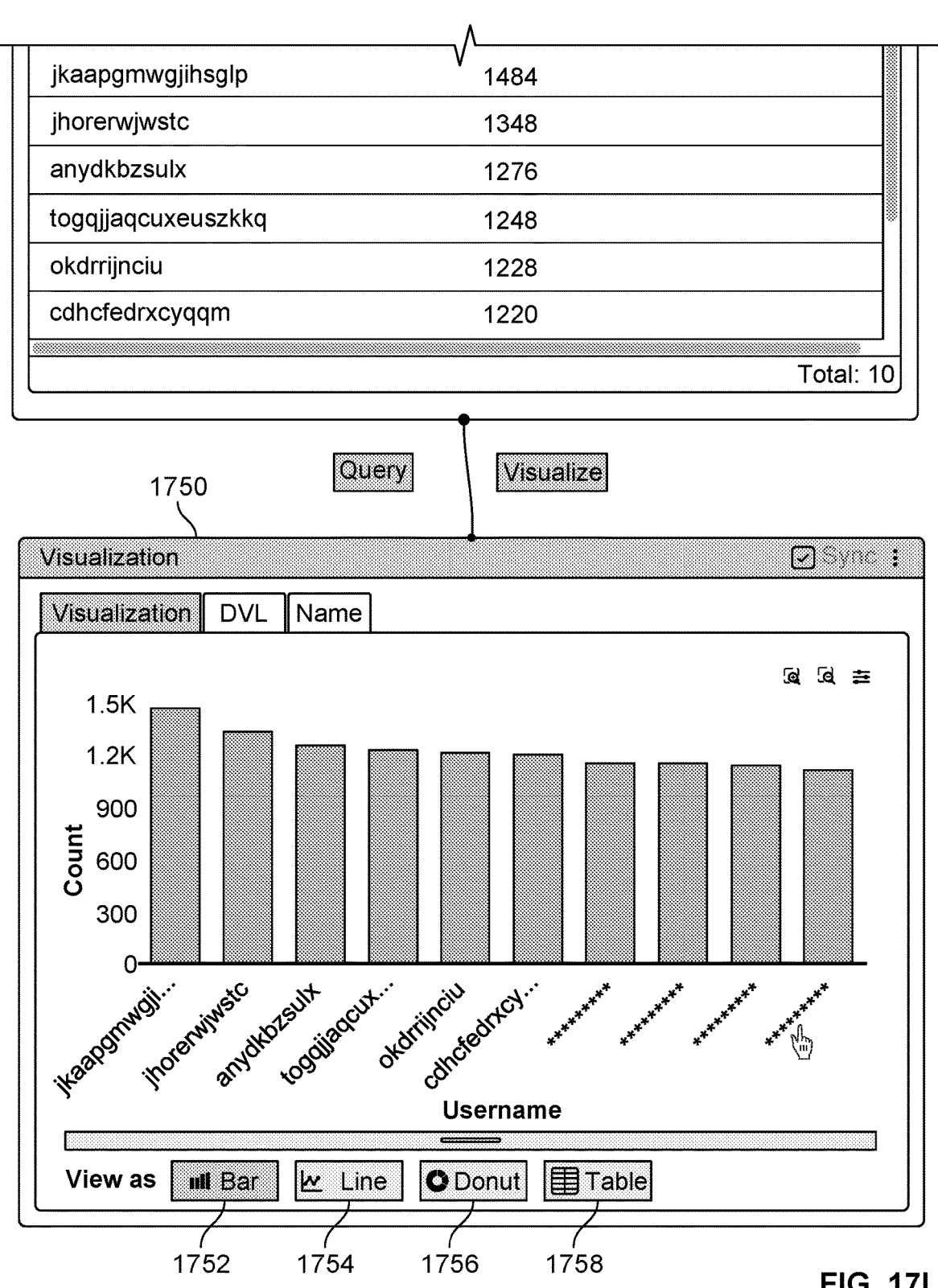

As seen in FIG. 17I, the user has the option to select how the query response data is to be visualized. The user may select to visualize the data as a bar graph 1752, a line graph 1754, a donut graph 1756, or a table 1758.

Figure 17J:
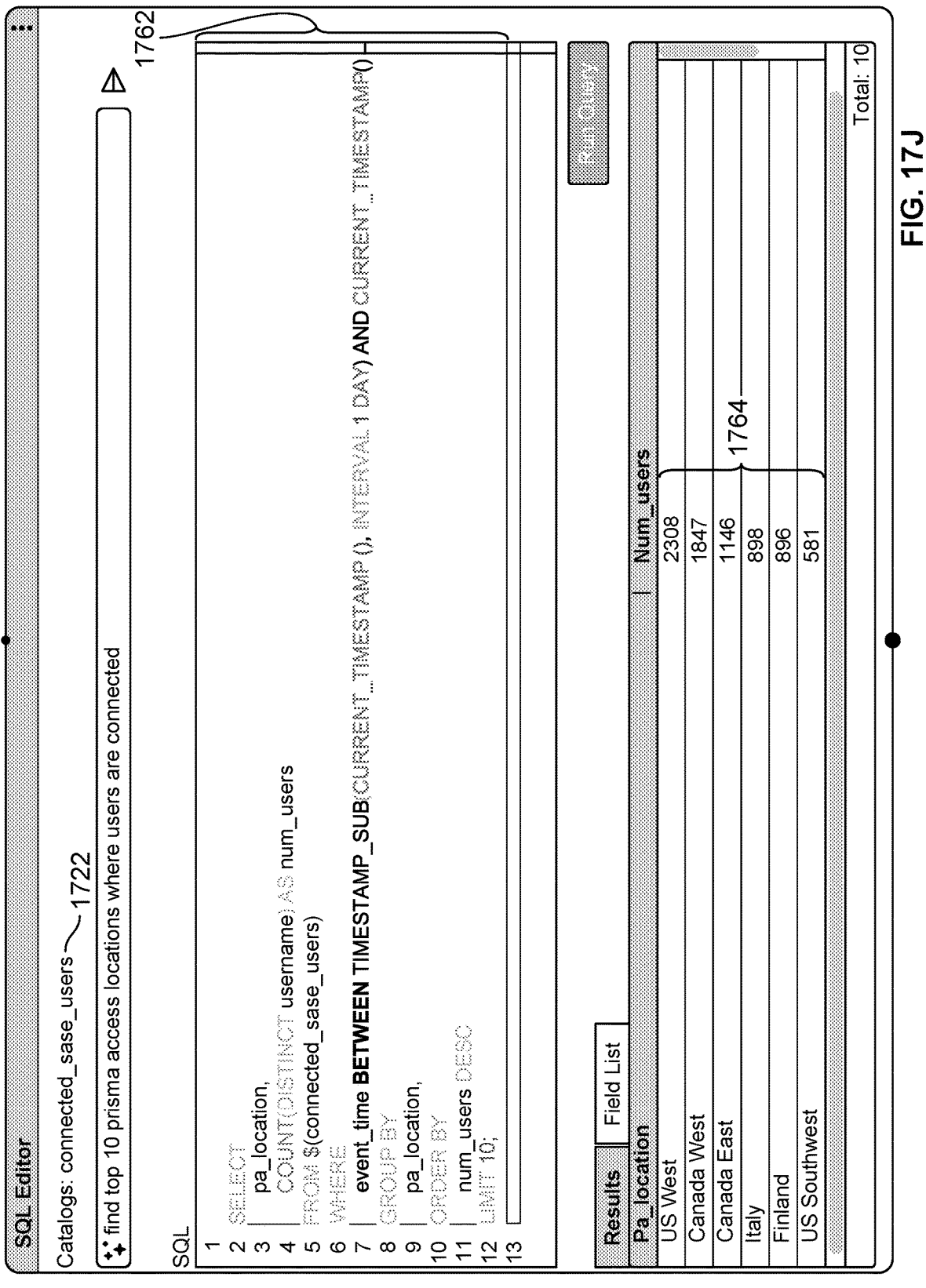
Figure 17K:
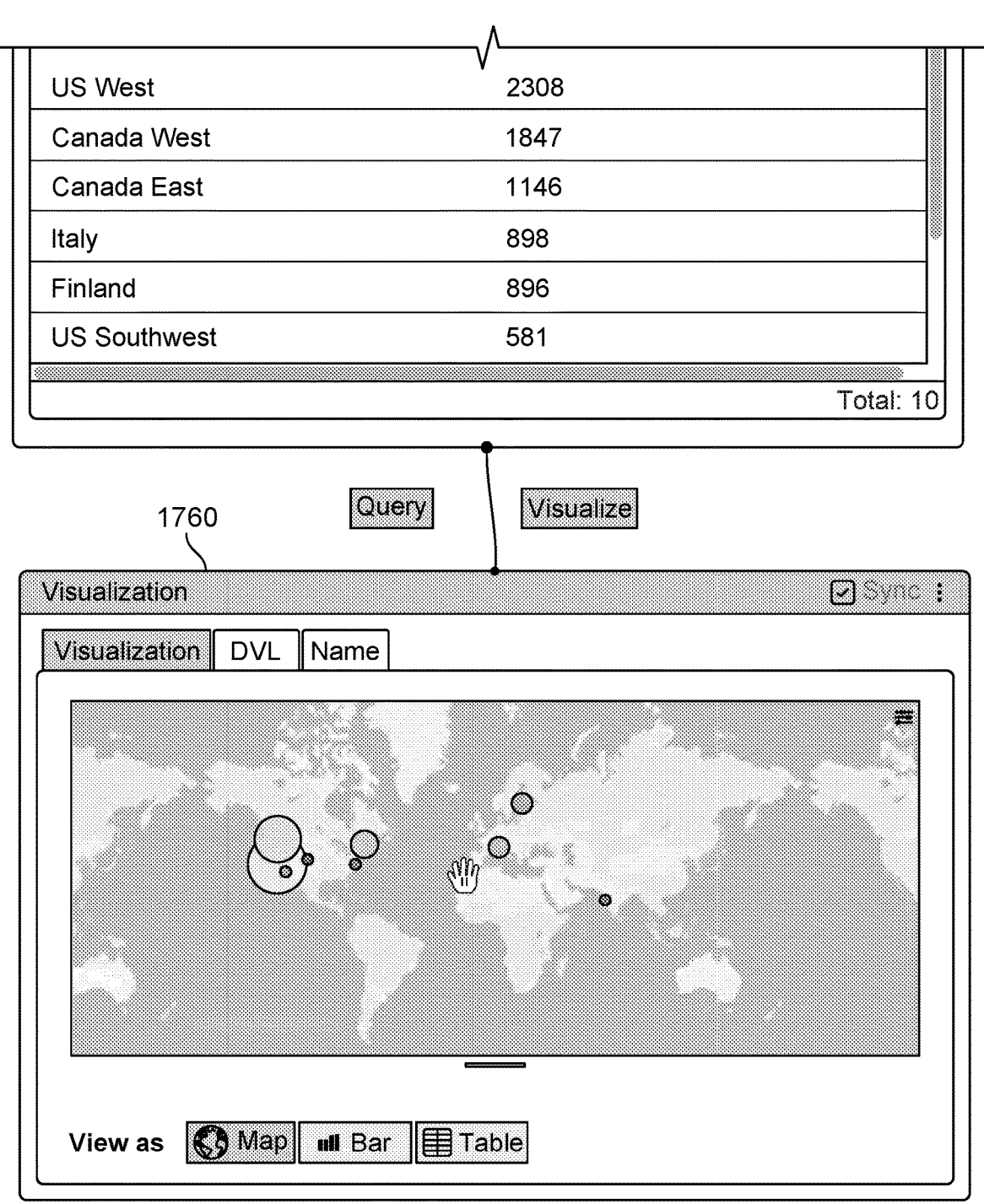

As seen in FIG. 17J, the user can input an additional query that utilizes the selected data catalog 1722. For a query of "find top 10 prisma access locations where users are connected," the LLM generates a SQL command 1762 to obtain the data. FIG. 17J displays the results 1764 for the query. As seen in FIG. 17K, the user has the option to select the manner in which the data is visualized. For this example, based on the data catalog associated with "connected_sa-se_users," the LLM has selected a map 1760 as the best way to visualize the data associated with a query of "find top 10 prisma access locations where users are connected."

Figure 17L:
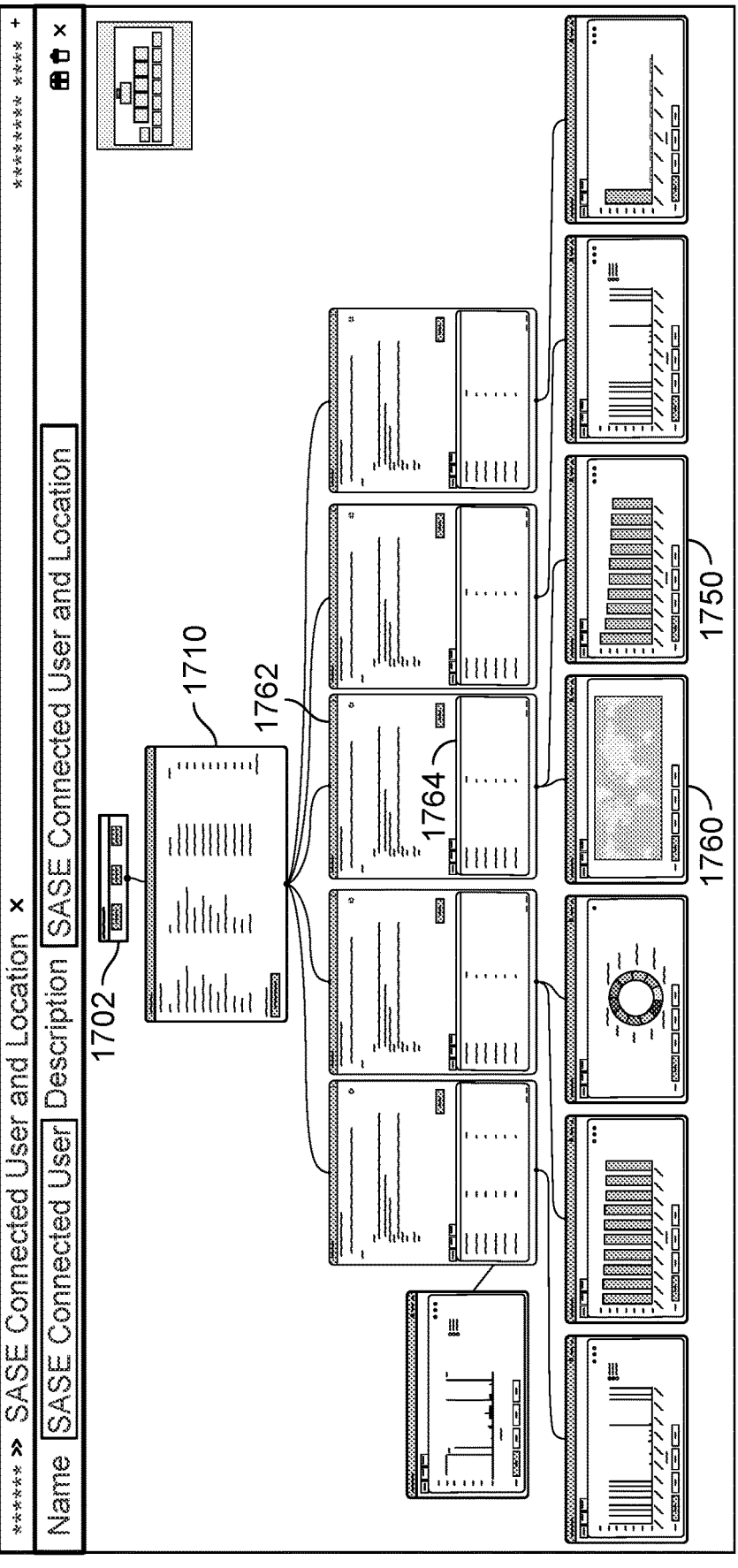

FIG. 17L illustrates a custom dashboard generated by a user. The customized dashboard 1700 is one of many custom dashboards that may be generated by a user to meet their specific needs. In some embodiments, the customized dashboards generated by a user are utilized by AI engine 117 to update the machine learning model associated with the user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, via a text input box associated with a user interface of a client device, an initial natural language prompt associated with a user;
generating a first dashboard based on the initial natural language prompt utilizing a machine learning model and user settings;
receiving, via the user interface of the client device, one or more follow-up prompts, wherein the follow-up prompts refine the initial query, adjust parameters, or apply filters on the fly;
performing a vector search over edges associated with a plurality of knowledge graphs to identify relevant entities to the follow-up prompts, wherein the edges comprise of subject, predicate, and object properties which are indexed through a data warehouse;
based on results of the vector search, determining one or more data catalogs corresponding to one or more data files needed to answer the follow-up prompts;
providing the one or more determined catalogs to a large language model;
utilizing the large language model to generate a structured query language (SQL) command to obtain the one or more data files needed to answer the one or more follow-up prompts;
executing the command to obtain the one or more data files;
applying one or more security policies to the one or more obtained data files using column-level access permissions stored in the one or more data catalogs to constrain results of executing the command to only data columns the user is authorized to access, and masking or anonymizing data to prevent the leakage of private user information; and
generating, at a display of the client device, one or more subsequent dashboards utilizing the machine learning model and the user settings associated with the user based on results of executing the command.

2. The method of claim 1, wherein the machine learning model is a reinforcement learning model, a supervised learning model, an unsupervised learning model, or a semi-supervised learning model.

3. The method of claim 1, wherein the user settings are updated each time a dashboard is generated for the user.

4. The method of claim 1, wherein the user settings indicate types of queries the user is asking, a type of information the user is interested in viewing in a dashboard with respect to different query types, types of widgets used to visualize the information, a configuration of the widgets on the dashboard, and/or size of the widgets on the dashboard.

5. The method of claim 1, further comprising receiving feedback on the first dashboard.

6. The method of claim 5, further comprising updating the user settings associated with the user based on the received feedback.

7. The method of claim 1, wherein the one or more follow-up prompts include natural language.

8. The method of claim 1, further comprising utilizing the one or more data catalogs corresponding to the one or more data files to interpret the data associated with the one or more data files.

9. The method of claim 8, wherein utilizing the one or more data catalogs corresponding to the one or more data files to interpret the data associated with the one or more data files includes normalizing the data associated with the one or more data files.

10. The method of claim 8, wherein generating the one or more subsequent dashboards includes visualizing the obtained data associated with the one or more follow-up prompts based on the one or more data catalogs corresponding to the one or more data files.

11. A system, comprising:
a processor configured to:
receive, via a text input box associated with a user interface of a client device, an initial natural language prompt;
generate a first dashboard based on the initial natural language prompt utilizing a machine learning model and user settings;
receive, via the user interface of the client device, one or more follow-up prompts, wherein the follow-up prompts refine the initial query, adjust parameters, or apply filters on the fly;
perform a vector search over edges associated with a plurality of knowledge graphs to identify relevant entities to the follow-up prompts, wherein the edges comprise of subject, predicate, and object properties which are indexed through a data warehouse;
based on results of the vector search, determine one or more data catalogs corresponding to one or more data files needed to answer the follow-up prompts;
provide the one or more determined catalogs to a large language model;
utilize the large language model to generate a structured query language (SQL) command to obtain the one or more data files needed to answer the one or more follow-up prompts;

execute the command to obtain the one or more data files;

apply one or more security policies to the one or more obtained data files using column-level access permissions stored in the one or more data catalogs to constrain results of executing the command to only data columns the user is authorized to access, and mask or anonymize data to prevent the leakage of private user information; and generate, at a display of the client device, one or more subsequent dashboards utilizing the machine learning model and the user settings associated with the user based on results of executing the command; and a memory coupled to the processor and configured to provide the processor with instructions.

12. The system of claim 11, wherein the one or more follow-up prompts include natural language.

13. The system of claim 11, wherein the processor is configured to utilize the one or more data catalogs corresponding to the one or more data files to interpret the data associated with the one or more data files.

14. The system of claim 11, wherein generating the one or more subsequent dashboards includes visualizing the obtained data associated with the one or more follow-up prompts based on the one or more data catalogs corresponding to the one or more data files.

15. A computer program product embodied in a non-transitory computer readable medium and comprising computer instructions for:

receiving, via a text input box associated with a user interface of a client device, an initial natural language prompt associated with a user;

generating a first dashboard based on the initial natural language prompt utilizing a machine learning model and user settings;

receiving, via the user interface of the client device, one or more follow-up prompts, wherein the follow-up prompts refine the initial query, adjust parameters, or apply filters on the fly;

performing a vector search over edges associated with a plurality of knowledge graphs to identify relevant entities to the follow-up prompts, wherein the edges comprise of subject, predicate, and object properties which are indexed through a data warehouse;

based on results of the vector search, determining one or more data catalogs corresponding to one or more data files needed to answer the follow-up prompts;

providing the one or more determined catalogs to a large language model;

utilizing the large language model to generate a structured query language (SQL) command to obtain the one or more data files needed to answer the one or more follow-up prompts;

executing the command to obtain the one or more data files;

applying one or more security policies to the one or more obtained data files using column-level access permissions stored in the one or more data catalogs to constrain results of executing the command to only data columns the user is authorized to access, and masking or anonymizing data to prevent the leakage of private user information; and generating, at a display of the client device, one or more subsequent dashboards utilizing the machine learning model and the user settings associated with the user based on results of executing the command.

* * * * *